(12) United States Patent
Xu et al.

(10) Patent No.: US 9,790,291 B2
(45) Date of Patent: Oct. 17, 2017

(54) NON-PHTHALATE COMPOUNDS AS ELECTRON DONORS FOR POLYOLEFIN CATALYSTS

(71) Applicant: Formosa Plastics Corporation, USA, Livingston, NJ (US)

(72) Inventors: Demin Xu, Port Lavaca, TX (US); Lei Zhang, Port Lavaca, TX (US)

(73) Assignee: Formosa Plastics Corporation, USA, Livingston, NJ (US)

( * ) Notice: Subject to any disclaimer, the term of this patent is extended or adjusted under 35 U.S.C. 154(b) by 0 days.

(21) Appl. No.: 13/827,509

(22) Filed: Mar. 14, 2013

(65) Prior Publication Data

US 2014/0275456 A1    Sep. 18, 2014

(51) Int. Cl.
*C08F 4/52* (2006.01)
*C08F 4/654* (2006.01)

(52) U.S. Cl.
CPC .............. *C08F 4/52* (2013.01); *C08F 4/6546* (2013.01)

(58) Field of Classification Search
CPC ........................................................ C08F 4/52
See application file for complete search history.

(56) References Cited

U.S. PATENT DOCUMENTS

| | | | |
|---|---|---|---|
| 6,887,817 B2 | 5/2005 | Lu et al. | |
| 6,956,003 B2 | 10/2005 | Kong et al. | |
| 6,992,034 B2 | 1/2006 | Xu et al. | |
| 7,211,534 B2 | 5/2007 | Lu et al. | |
| 7,307,036 B2 | 12/2007 | Xu et al. | |
| 7,582,712 B1 | 9/2009 | Xu et al. | |
| 7,618,913 B2 | 11/2009 | Xu et al. | |
| 7,619,049 B1 | 11/2009 | Fang et al. | |
| 7,651,969 B2 | 1/2010 | Kong et al. | |
| 7,718,713 B2 | 5/2010 | Shih et al. | |
| 7,790,819 B1 | 9/2010 | Fang et al. | |
| 7,935,766 B2 | 5/2011 | Sheard et al. | |
| 8,088,872 B2 | 1/2012 | Chen et al. | |
| 8,211,819 B2 | 7/2012 | Chang | |
| 8,222,357 B2 | 7/2012 | Chen | |
| 8,227,370 B2 | 7/2012 | Chang | |
| 8,236,908 B2 | 8/2012 | Hirahata et al. | |
| 8,247,341 B2 | 8/2012 | Gonzalez et al. | |
| 8,263,520 B2 | 9/2012 | Coalter, III et al. | |
| 8,263,692 B2 | 9/2012 | Sheard et al. | |
| 8,288,304 B2 | 10/2012 | Chen et al. | |
| 8,288,488 B2 | 10/2012 | Fujiwara et al. | |
| 8,288,585 B2 | 10/2012 | Chen et al. | |
| 8,288,606 B2 | 10/2012 | Uhrhammer et al. | |
| 8,318,626 B2 | 11/2012 | Chang | |
| 2004/0132936 A1 | 7/2004 | Tagge et al. | |
| 2007/0179047 A1 | 8/2007 | Uhrhammer et al. | |
| 2010/0168342 A1* | 7/2010 | Sheard et al. | ............. 525/249 |
| 2010/0273641 A1 | 10/2010 | Chen et al. | |
| 2011/0130530 A1* | 6/2011 | Coalter, III | ........... C08F 110/06 526/124.1 |
| 2015/0291755 A1* | 10/2015 | Abubakar | ............. C08F 110/06 521/143 |

FOREIGN PATENT DOCUMENTS

| | | |
|---|---|---|
| EP | 2169007 B1 | 7/2012 |
| WO | 2012007430 A1 | 1/2012 |

OTHER PUBLICATIONS

PCT Application No. US2014/025625; International Search Report and Written Opinion of the International Searching Authority for Applicant Formosa Plastics Corporation, USA dated Sep. 3, 2014.
PCT Application No. US2014/025625; Third Party Observation, dated Jun. 23, 2015.

* cited by examiner

*Primary Examiner* — Catherine S Branch
(74) *Attorney, Agent, or Firm* — Jones Walker LLP

(57) ABSTRACT

Non-phthalate compounds having a structure represented by the general formula

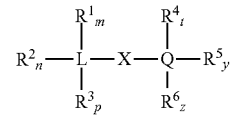

and a method for using same are provided as electron donors in the Ziegler-Natta type catalyst system for the homopolymerization or copolymerization of alpha olefins. The non-phthalate compounds may be used in the preparation of the solid catalyst component, thus serving as "internal electron donors", or employed during or prior to polymerization as "external electron donors," and therefore they can be used to prepare phthalate-free polyolefins.

38 Claims, No Drawings

NON-PHTHALATE COMPOUNDS AS ELECTRON DONORS FOR POLYOLEFIN CATALYSTS

BACKGROUND OF THE INVENTION

1. Field of the Invention

The present invention relates to catalyst components for olefin polymerization, to the catalyst obtained from said components, and to the use of said catalysts in olefin polymerization. In particular, the present invention relates to catalyst components suitable for the stereospecific polymerization of olefins, including Ti, Mg, halogen and an electron donor compound selected from non-phthalate compounds having two or more functional radicals. Said catalyst components when used in the polymerization of olefins, and in particular of polypropylene, does not contain a phthalate.

2. Description of the Related Art

The use of Ziegler-Natta catalyst systems for olefin polymerization is well known in the art. For the polymerization of propylene, the widely used catalyst family belongs to the Ziegler-Natta category, generally comprising a solid catalyst component and a co-catalyst component, usually an organoaluminum compound. To improve the activity and sterospecificity of the catalyst system, certain electron donating compounds have been included and used (1) as an internal electron donor in the solid catalyst component and/or (2) as an external electron donor to be used in conjunction with the solid catalyst component and the co-catalyst component.

Common internal electron donor compounds, incorporated in the solid Ziegler-Natta catalyst components during preparation of such catalysts, include esters, ethers, ketones, amines, alcohols, phenols, phosphines and silanes. Of this group of compounds, phthalates, dibenzoic esters of 1,3-diol, diethers, and succinates have been most preferred. Examples of such internal electron donor compounds and their use as a component of the solid catalyst system are described in U.S. Pat. Nos. 4,107,414, 4,186,107, 4,226,963, 4,347,160, 4,382,019, 4,435,550, 4,465,782, 4,530,912, 4,532,313, 4,560,671, 4,657,882, 5,208,302, 5,902,765, 5,948,872, 6,121,483, 6,436,864, 6,770,586, 7,022,640, 7,049,377, 7,202,314, 7,208,435, 7,223,712, 7,351,778, 7,371,802, 7,491,781, 7,544,748, 7,674,741, 7,674,943, 7,888,437, 7,888,438, 7,964,678, 8,003,558 and 8,003,559, which are incorporated by reference herein.

This group of internal donors may be used in combination with an external donor, which is capable of good activity and yielding propylene polymers with high isotacticity and xylene or heptane insolubility endowed with an intermediate molecular weight distribution. Acceptable external electron donors include organic compounds containing O, Si, N, S, and P. Such compounds include organic acids, organic acid esters, organic acid anhydrides, ethers, ketones, alcohols, aldehydes, silanes, amides, amines, amine oxides, thiols, various phosphorus acid esters, amides etc. Preferred external donors are organosilicon compounds containing Si—O—C and/or Si—N—C bonds, having silicon as the central atom. Such compounds are described in U.S. Pat. Nos. 4,472,524, 4,473,660, 4,560,671, 4,581,342, 4,657,882, 5,106,807, 5,407,883, 5,684,173, 6,228,961, 6,362,124, 6,552,136, 6,689,849, 7,009,015, 7,244,794, 7,619,049 and 7,790,819, which are incorporated by reference herein.

Most commercial propylene polymerization catalysts currently use alkyl phthalates as an internal electron donor. However, certain environmental issues have been recently raised concerning the continued use of phthalates in human contact applications. As a result, the employment of a phthalate-free propylene polymerization catalyst is now necessary for the production of phthalate-free polypropylene to remedy these issues.

U.S. Pat. No. 7,491,781 in particular describes the use of an internal donor in a propylene polymerization catalyst component which does not contain a phthalate. However the resulted propylene polymerization catalyst has relatively poor hydrogen response and the polymer produced exhibits lower isotacticity than the catalyst containing a phthalate internal electron donor.

The polypropylene market also has an increasing demand for high melt flow rate (MFR) grade polypropylene to reduce cycle time and to achieve down-gauging while maintaining acceptable impact strength and stiffness. High MFR polypropylene is commonly achieved by adding peroxide to the polymer, but such obtained polypropylene usually has odor issues and the physical properties are sacrificed somehow. As such, production of reactor-grade high MFR polypropylene becomes necessary to avoid these issues.

As such, there is a continuous need for developing catalyst systems that can be used to produce polyolefins, particularly polypropylene, which does not contain a phthalate, and further offers the capability to produce reactor-grade polypropylene with acceptable isotacticity and high MFR.

SUMMARY OF THE INVENTION

This invention relates to non-phthalate compounds and their preparation methods, to their applications as electron donors for polymerization catalyst systems, to polymerization catalyst systems employing these organic compounds as a component, to methods of making such polymerization catalyst systems, and to polymerization processes to produce polyolefins, particularly polypropylene, which does not contain a phthalate.

The non-phthalate compounds of the present invention that may be used as electron donors in olefin polymerization catalyst systems are represented by Formula 1:

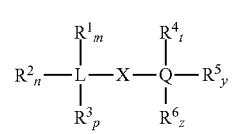

[Formula 1]

$R^1, R^2, R^3, R^4, R^5$ and $R^6$, which may be identical or different, are selected from an aliphatic hydrocarbon group, an alicyclic hydrocarbon group, an aromatic hydrocarbon group, or a polycyclic hydrocarbon group, in which one or more H and C atoms can be replaced by other atoms, including but not limited to O, N, S, P, B, Si, and halogen atoms. The length and structure of $R^1, R^2, R^3, R^4, R^5$ and $R^6$ are not otherwise limited. In preferred embodiments of the present invention, $R^1, R^2, R^3, R^4, R^5$ and $R^6$ are hydrogen, halogen, alkyl, substituted alkyl, cyclo-alkyl, aryl, arylalkyl, alkylaryl, alkenyl, cycloalkyl, or heterocycles. The said $R^1, R^2, R^3, R^4, R^5$ and $R^6$ groups may also join to each other and/or to group X to form cycles. The subscripts m, n, p and t, y, z, depending on the valence state of L and Q, are independently selected from 1 to 3.

L and Q are functional groups containing at least one atom selected from O, S, N, and P atoms.

X is selected from an aliphatic hydrocarbon group, an alicyclic hydrocarbon group, an aromatic hydrocarbon group, or a polycyclic hydrocarbon group, in which one or more H and C atoms may be replaced by other atoms, including but not limited to O, N, S, P, B, and halogen atoms. In an embodiment, X may contain functional groups containing at least one of O, S, N, and P atoms.

In one embodiment of the present invention, the process of catalyst component preparation includes halogenating a procatalyst precursor in the presence of the non-phthalate compounds of Formula 1.

Advantages of the present invention include:
the catalyst system does not contain a phthalate compound.
provides a method for polymerizing or copolymerizing olefins using a phthalate-free catalyst system.
the catalyst system produces olefin-based polymers which are free of phthalates.
the catalyst system produces an olefin-based polymer with a high melt flow rate.
the catalyst system has improved hydrogen response in producing olefin-based polymers with a high melt flow rate, and/or broad molecular weight distribution, and/or high flexural modulus.
the catalyst system provides a good balance of catalyst performance in terms of activity and stereospecificity.

DETAILED DESCRIPTION

The present invention provides a solid catalyst component for the polymerization of olefins $CH_2=CHR$ in which R is hydrogen or $C_{1-12}$ alkyl or aryl, comprising magnesium, titanium, halogen and an electron donor, wherein said electron donor contains non-phthalate compounds. The non-phthalate compounds of the present invention that may be used as electron donors in polymerization catalyst systems are represented by Formula 1:

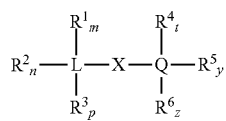

[Formula 1]

wherein $R^1$, $R^2$, $R^3$, $R^4$, $R^5$ and $R^6$, which may be identical or different, are selected from an aliphatic hydrocarbon group, an alicyclic hydrocarbon group, an aromatic hydrocarbon group, or a polycyclic hydrocarbon group, in which one or more H and C atoms can be replaced by other atoms, including but not limited to O, N, S, P, B, Si, and halogen atoms. The length and structure of $R^1$, $R^2$, $R^3$, $R^4$, $R^5$ and $R^6$ are not otherwise limited. In preferred embodiments of the present invention, $R^1$, $R^2$, $R^3$, $R^4$, $R^5$ and $R^6$ are hydrogen, halogen, alkyl, substituted alkyl, cyclo-alkyl, aryl, arylalkyl, alkylaryl, alkenyl, cycloalkyl, or heterocycles. The said $R^1$, $R^2$, $R^3$, $R^4$, $R^5$ and $R^6$ groups may also join to each other and/or to group X to form cycles. The subscripts m, n, p and t, y, z, depending on the valence state of L and Q, are independently selected from 1 to 3.

X is selected from the groups consisting of an aliphatic hydrocarbon group, an alicyclic hydrocarbon group, an aromatic hydrocarbon group and a polycyclic hydrocarbon group, in which one or more H and C atoms may be replaced by other atoms, including but not limited to O, N, S, P, B, and halogen atoms. The length and structure of X are not otherwise limited. In preferred embodiments of the present invention, X is a C1-C20 hydrocarbon group.

L and Q are functional groups containing at least one atom selected from O, S, N, and P atoms, and may, for example, be independently selected from the functional groups of Group 1-Group 15:

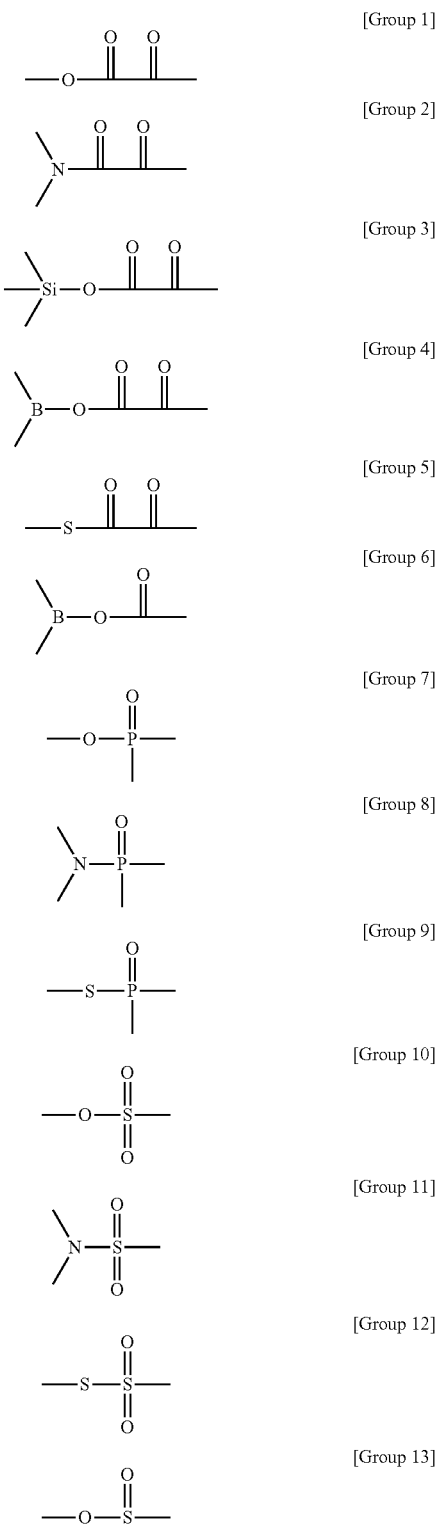

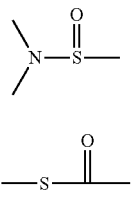

[Group 14]

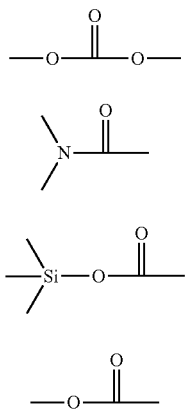

[Group 15]

Additionally, Q may be selected from the functional groups of Group 16-Group 19:

[Group 16]

[Group 17]

[Group 18]

[Group 19]

Additionally, the bridging group X may have one or more functional groups independently selected from the functional groups of Group 1 to Group 19.

Additionally, two or more of said $R^1$, $R^2$, $R^3$, $R^4$, $R^5$, $R^6$ and X may be linked to form one or more saturated or unsaturated monocyclic or polycyclic rings.

The present invention also relates to non-phthalate compounds, a process of synthesizing them, and applications for same as an electron donor for polymerization catalyst systems, to polymerization catalyst systems employing these organic compounds as an electron donor, to methods of making such polymerization catalyst systems, and to polymerization processes to produce polyolefins, particularly polypropylene, which does not contain a phthalate.

A novel class of non-phthalate compounds, as described herein, may be used as electron donors in polymerization catalyst systems for the production of polyolefins, particularly polypropylene, is released. These non-phthalate compounds may be used as either an internal electron donor or an external electron donor. Preferably, these non-phthalate compounds are used as an internal electron donor.

Electron donors of the present invention which utilize non-phthalate compounds of Formula 1 include, but are not limited to, glyoxylate esters, silanol esters, sulfonic acid esters, phosphinate esters, borinic acid esters, thioalcohol esters, silanol esters, sulfonamides, and their derivatives.

In one preferred embodiment of the present invention, the non-phthalate compounds are diol alpha-keto acid esters of Formula 2 and Formula 3:

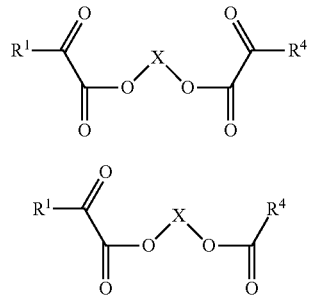

[Formula 2]

[Formula 3]

wherein $R^1$ and $R^4$ are as defined in Formula 1, with proviso that the functional groups L and Q are alpha-keto acid esters or carboxylic ester.

In this preferred embodiment, $R^1$ and $R^4$ are halogen, alkyl, substituted alkyl, cyclo-alkyl, aryl, arylalkyl, alkylaryl, alkenyl, cycloalkyl, or heterocycles. The length and structure of $R^1$ and $R^2$ are not otherwise limited. The said $R^1$ and $R^4$ groups can also join to each other and/or to group X to form cycles.

X is selected from an aliphatic hydrocarbon group, an alicyclic hydrocarbon group, an aromatic hydrocarbon group, or a polycyclic hydrocarbon group, in which one or more H and C atoms may be replaced by other atoms, including but not limited to O, N, S, P, B, and halogen atoms. The length and structure of X are not otherwise limited. In preferred embodiments of the present invention, X is a C1-C20 hydrocarbon group.

Nonlimiting examples of diol alpha-keto acid esters include: 1,2-ethylene glycol diphenylglyoxylate, 1,2-propanediol diphenylglyoxylate, 1,2-butanediol diphenylglyoxylate, 2,3-butanediol diphenylglyoxylate, 2,4-pentanediol diphenylglyoxylate, 3,5-heptanediol diphenylglyoxylate, 2,6-dimethyl-3,5-heptanediol diphenylglyoxylate, 6-methyl-2,4-heptanediol diphenylglyoxylate, 3-methyl-2,4-pentanediol diphenylglyoxylate, 3,3-dimethyl-2,4-pentanediol diphenylglyoxylate, 3-butyl-2,4-pentanediol diphenylglyoxylate, 3-allyl-2,4-pentanediol diphenylglyoxylate, 4-methyl-3,5-heptanediol diphenylglyoxylate, 2-ethyl-1,3-hexanediol diphenylglyoxylate, 2,2,4-trimethyl-1,3-pentanediol diphenylglyoxylate, 4-methyl-3,5-octanediol diphenylglyoxylate, 5-methyl-4,6-nonanediol diphenylglyoxylate, 1,3-propanediol diphenylglyoxylate, 1,3-diphenyl-1,3-propanediol diphenylglyoxylate, 2-methyl-1,3-diphenyl-1,3-propanediol diphenylglyoxylate, 2,2-dimethyl-1,3-diphenyl-1,3-propanedioldiphenylglyoxylate, 2-methyl-1-phenyl-1,3-butanediol diphenylglyoxylate, 2,2,4,6,6-pentamethyl-3,5-hexanediol diphenylglyoxylate, 1,3-di-tert-butyl-2-ethyl-1,3-propanediol diphenylglyoxylate, 2-(2-furyl)-2-methyl-1,3-butanediol diphenylglyoxylate, 2-isoamyl-2-isopropyl-1,3-propanediol diphenylglyoxylate, 2,2-diisobutyl-1,3-propanediol diphenylglyoxylate, 1,3-diisopropyl-1,3-propanediol diphenylglyoxylate, 3-methyl-1-trifluoromethyl-2,4-pentanediol diphenylglyoxylate, 1 μl, 1-trifluoro-3-methyl-2,4-pentanediol diphenylglyoxylate, 4,4,4-trifluoro-1-(2-naphthyl)-1,3-butanediol diphenylglyoxylate, 2-ethyl-2-methyl-1,3-propanediol diphenylglyoxylate, 4,6-nonanediol diphenylglyoxylate, 2-amino-1-phenyl-1,3-propanediol diphenylglyoxylate, 2,2-dimethyl-1,3-propanedioldiphenylglyoxylate, 3-butyl-3-methyl-2,4-pentanediol diphenylglyoxylate, 3,6-dimethyl-2,4-heptanediol diphenylglyoxylate, 2,2,6,6-tetramethyl-3,5-heptanediol diphenylglyoxylate, 2,3-diisopropyl-1,4- butanediol diphenylglyoxylate, 2,3-dimethyl-1,4-butanediol diphenylglyoxylate, 2,3-diethyl-1,4-butanediol diphenylglyoxylate, 2,3-dibutyl-1,4-butanediol diphenylglyoxylate, 2,3-diisopropyl-1,4-butanediol diphenylglyoxylate, 2,5-hexanediol diphenylglyoxylate, 2,5-dimethyl-2,5-hexanediol diphenylglyoxylate, 2,5-dimethyl-hex-3-yne-2,5-diol diphenylglyoxylate, hex-3-yne-2,5-diol diphenylglyoxylate, 2,2-dimethyl-1,5-pentanediol diphenylglyoxylate, 2,6-dimethyl-2,6-heptanediol diphenylglyoxylate, 1,2-ethylene glycol dimesitylglyoxylate, 1,2-propanediol dimesitylglyoxylate, 1,2-butanediol dimesitylglyoxylate, 2,3-butanediol dimesitylglyoxylate, 2,4-pentanediol dimesitylglyoxylate, 3,5-heptanediol dimesitylglyoxylate, 2,6-dimethyl-3,5-heptanediol dimesitylglyoxylate, 6-methyl-2,4-heptanediol dimesitylglyoxylate, 3-methyl-2,4-pentanediol dimesitylglyoxylate, 3,3-dimethyl-2,4-pentanediol dimesitylglyoxylate, 3-ethyl-2,4-pentanediol dimesitylglyoxylate, 3-butyl-2,4-pentanediol dimesitylglyoxylate, 3-allyl-2,4-pentanediol dimesitylglyoxylate, 4-methyl-3,5-heptanediol dimesitylglyoxylate, 2-ethyl-1,3-hexanediol dimesitylglyoxylate, 2,2,4-trimethyl-1,3-pentanediol dimesitylglyoxylate, 4-methyl-3,5-octanediol dimesitylglyoxylate, 5-methyl-4,6-nonanediol dimesitylglyoxylate, 1,3-propanediol dimesitylglyoxylate, 1,3-diphenyl-1,3-propanediol dimesitylglyoxylate, 2-methyl-1,3-diphenyl-1,3-propanediol dimesitylglyoxylate, 2,2-dimethyl-1,3-diphenyl-1,3-propanediol dimesitylglyoxylate, 2-methyl-1-phenyl-1,3-butanediol dimesitylglyoxylate, 2,2,4,6,6-pentamethyl-3,5-hexanediol dimesitylglyoxylate, 1,3-di-tert-butyl-2-ethyl-1,3-propanediol dimesitylglyoxylate, 2-(2-furyl)-2-methyl-1,3-butanediol dimesitylglyoxylate, 2-isoamyl-2-isopropyl-1,3-propanediol dimesitylglyoxylate, 2,2-diisobutyl-1,3-propanediol dimesitylglyoxylate, 1,3-diisopropyl-1,3-propanediol dimesitylglyoxylate, 3-methyl-1-trifluoromethyl-2,4-pentanediol dimesitylglyoxylate, 1,1,1-trifluoro-3-methyl-2,4-pentanediol dimesitylglyoxylate, 4,4,4-trifluoro-1-(2-naphthyl)-1,3-butanediol dimesitylglyoxylate, 2-ethyl-2-methyl-1,3-propanediol dimesitylglyoxylate, 4,6-nonanediol dimesitylglyoxylate, 2-amino-1-phenyl-1,3-propanediol dimesitylglyoxylate, 2,2-dimethyl-1,3-propanediol dimesitylglyoxylate, 3-butyl-3-methyl-2,4-pentanediol dimesitylglyoxylate, 3,6-dimethyl-2,4-heptanediol dimesitylglyoxylate, 2,2,6,6-tetramethyl-3,5-heptanediol dimesitylglyoxylate, 2,3-diisopropyl-1,4-butanediol dimesitylglyoxylate, 2,3-dimethyl-1,4-butanediol dimesitylglyoxylate, 2,3-diethyl-1,4-butanediol dimesitylglyoxylate, 2,3-dibutyl-1,4-butanediol dimesitylglyoxylate, 2,3-diisopropyl-1,4-butanediol dimesitylglyoxylate, 2,5-hexanediol dimesitylglyoxylate, 2,5-dimethyl-2,5-hexanediol dimesitylglyoxylate, 2,5-dimethyl-hex-3-yne-2,5-diol dimesitylglyoxylate, hex-3-yne-2,5-diol dimesitylglyoxylate, 2,2-dimethyl-1,5-pentanediol dimesitylglyoxylate, 2,6-dimethyl-2,6-heptanediol dimesitylglyoxylate, 1,2-ethylene glycol benzoate phenylglyoxylate, 1,2-propanediol benzoate phenylglyoxylate, 1,2-butanediol benzoate phenylglyoxylate, 2,3-butanediol benzoate phenylglyoxylate, 2,4-pentanediol benzoate phenylglyoxylate, 3,5-heptanediol, benzoate phenylglyoxylate, 2,6-dimethyl-3,5-heptanediol benzoate phenylglyoxylate, 6-methyl-2,4-heptanediol benzoate phenylglyoxylate, 3-methyl-2,4-pentanediol benzoate phenylglyoxylate, 3,3-dimethyl-2,4-pentanediol benzoate phenylglyoxylate, 3-ethyl-2,4-pentanediol benzoate phenylglyoxylate, 3-butyl-2,4-pentanediol benzoate phenylglyoxylate, 3-allyl-2,4-pentanediol benzoate phenylglyoxylate, 4-methyl-3,5-heptanediol benzoate phenylglyoxylate, 2-ethyl-1,3-hexanediol benzoate phenylglyoxylate, 2,2,4-trimethyl-1,3-pentanediol benzoate phenylglyoxylate, 4-methyl-3,5-octanediol benzoate phenylglyoxylate, 5-methyl-4,6-nonanediol benzoate phenylglyoxylate, 1,3-propanediol benzoate phenylglyoxylate, 1,3-diphenyl-1,3-propanediol benzoate phenylglyoxylate, 2-methyl-1,3-diphenyl-1,3-propanediol benzoate phenylglyoxylate, 2,2-dimethyl-1,3-diphenyl-1,3-propanediol benzoate phenylglyoxylate, 2-methyl-1-phenyl-1,3-butanediol benzoate phenylglyoxylate, 2,2,4,6,6-pentamethyl-3,5-hexanediol benzoate phenylglyoxylate, 1,3-di-tert-butyl-2-ethyl-1,3-propanediol benzoate phenylglyoxylate, 2-(2-furyl)-2-methyl-1,3-butanediol benzoate phenylglyoxylate, 2-isoamyl-2-isopropyl-1,3-propanediol benzoate phenylglyoxylate, 2,2-diisobutyl-1,3-propanediol benzoate phenylglyoxylate, 1,3-diisopropyl-1,3-propanediol benzoate phenylglyoxylate, 3-methyl-1-trifluoromethyl-2,4-pentanediol benzoate phenylglyoxylate, 1,1,1-trifluoro-3-methyl-2,4-pentanediol benzoate phenylglyoxylate, 4,4,4-trifluoro-1-(2-naphthyl)-1,3-butanediol benzoate phenylglyoxylate, 2-ethyl-2-methyl-1,3-propanediol benzoate phenylglyoxylate, 4,6-nonanediol benzoate phenylglyoxylate, 2-amino-1-phenyl-1,3-propanediol benzoate phenylglyoxylate, 2,2-dimethyl-1,3-propanediol benzoate phenylglyoxylate, 3-butyl-3-methyl-2,4-pentanediol benzoate phenylglyoxylate, 3,6-dimethyl-2,4-heptanediol benzoate phenylglyoxylate, 2,2,6,6-tetramethyl-3,5-heptanediol benzoate phenylglyoxylate, 2,3-dimethyl-1,4-butanediol benzoate phenylglyoxylate, 2,3-diethyl-1,4-butanediol benzoate phenylglyoxylate, 2,3-dibutyl-1,4-butanediol benzoate phenylglyoxylate, 2,3-diisopropyl-1,4-butanediol benzoate phenylglyoxylate, 2,5-hexanediol benzoate phenylglyoxylate, 2,5-dimethyl-2,5-hexanediol benzoate phenylglyoxylate, 2,5-dimethyl-hex-3-yne-2,5-diol benzoate phenylglyoxylate, hex-3-yne-2,5-diol benzoate phenylglyoxylate, 2,2-dimethyl-1,5-pentanediol benzoate phenylglyoxylate, 2,6-dimethyl-2,6-heptanediol benzoate phenylglyoxylate, 1,2-ethylene glycol benzoate mesitylglyoxylate, 1,2-propanediol benzoate mesitylglyoxylate, 1,2-butanediol benzoate mesitylglyoxylate, 2,3-butanediol benzoate mesitylglyoxylate, 2,4-pentanediol benzoate mesitylglyoxylate, 3,5-heptanediol benzoate mesitylglyoxylate, 2,6-dimethyl-3,5-heptanediol benzoate mesitylglyoxylate, 6-methyl-2,4-heptanediol benzoate mesitylglyoxylate, 3-methyl-2,4-pentanediol benzoate mesitylglyoxylate, 3,3-dimethyl-2,4-pentanediol benzoate mesitylglyoxylate, 3-ethyl-2,4-pentanediol benzoate mesitylglyoxylate, 3-butyl-2,4-pentanediol benzoate mesitylglyoxylate, 3-allyl-2,4-pentanediol benzoate mesitylglyoxylate, 4-methyl-3,5-heptanediol benzoate mesitylglyoxylate, 2-ethyl-1,3-hexanediol benzoate mesitylglyoxylate, 2,2,4-trimethyl-1,3-pentanediol benzoate mesitylglyoxylate, 4-methyl-3,5-octanediol benzoate mesitylglyoxylate, 5-methyl-4,6-nonanediol benzoate mesitylglyoxylate, 1,3-propanediol benzoate mesitylglyoxylate, 1,3-diphenyl-1,3-propanediol benzoate mesitylglyoxylate, 2-methyl-1,3-diphenyl-1,3-propanediol benzoate mesitylglyoxylate, 2,2-dimethyl-1,3-diphenyl-1,3-propanediol benzoate mesitylglyoxylate, 2-methyl-1-phenyl-1,3-butanediol benzoate mesitylglyoxylate, 2,2,4,6,6-pentamethyl-3,5-hexanediol benzoate mesitylglyoxylate, 1,3-di-tert-butyl-2-ethyl-1,3-propanediol benzoate mesitylglyoxylate, 2-(2-furyl)-2-methyl-1,3-butanediol benzoate mesitylglyoxylate, 2-isoamyl-2-isopropyl-1,3-propanediol benzoate mesitylglyoxylate, 2,2-diisobutyl-1,3-propanediol benzoate mesitylglyoxylate, 1,3-diisopropyl-1,3-propanediol benzoate mesitylglyoxylate, 3-methyl-1-trifluoromethyl-2,4-pentanediol benzoate mesitylglyoxylate, 1,1,1-trifluoro-3-methyl-2,4-pentanediol benzoate mesitylglyoxylate, 4,4,4-trifluoro-1-(2-naphthyl)-1,3- butanediol benzoate mesitylglyoxylate, 2-ethyl-2-methyl-1,3-propanediol benzoate mesitylglyoxylate, 4,6-nonanediol benzoate mesitylglyoxylate, 2-amino-1-phenyl-1,3-propanediol benzoate mesitylglyoxylate, 2,2-dimethyl-1,3-propanediol benzoate mesitylglyoxylate, 3-butyl-3-methyl-2,4-pentanediol benzoate mesitylglyoxylate, 3,6-dimethyl-2,4-heptanediol benzoate mesitylglyoxylate, 2,2,6,6-tetramethyl-3,5-heptanediol benzoate mesitylglyoxylate, 2,3-diisopropyl-1,4-butanediol benzoate mesitylglyoxylate, 2,3-dimethyl-1,4-butanediol benzoate mesitylglyoxylate, 2,3-diethyl-1,4-butanediol benzoate mesitylglyoxylate, 2,3-dibutyl-1,4-butanediol benzoate mesitylglyoxylate, 2,5-hexanediol benzoate mesitylglyoxylate, 2,5-dimethyl-2,5-hexanediol benzoate mesitylglyoxylate, 2,5-dimethyl-hex-3-yne-2,5-diol benzoate mesitylglyoxylate, hex-3-yne-2,5-diol benzoate mesitylglyoxylate, 2,2-dimethyl-1,5-pentanediol benzoate mesitylglyoxylate, and 2,6-dimethyl-2,6-heptanediol benzoate mesitylglyoxylate.

In another preferred embodiment of the present invention, the non-phthalate compounds are diol phosphinate esters as described in Formula 4 and Formula 5:

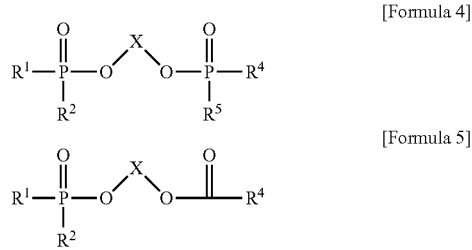

[Formula 4]

[Formula 5]

wherein $R^1$, $R^2$, $R^4$ and $R^5$ are as defined in Formula 1, with proviso that the functional groups L and Q are phosphinate esters or carboxylic esters.

In this preferred embodiment, $R^1$, $R^2$, $R^4$ and $R^5$ are halogen, alkyl, substituted alkyl, cyclo-alkyl, aryl, arylalkyl, alkylaryl, alkenyl, cycloalkyl or heterocycles. The length and structure of $R^1$ and $R^2$ are not otherwise limited. The said $R^1$, $R^2$, $R^4$ and $R^5$ groups may also join to each other and/or to group X to form cycles.

X is selected from an aliphatic hydrocarbon group, an alicyclic hydrocarbon group, an aromatic hydrocarbon group, or a polycyclic hydrocarbon group, in which one or more H and C atoms may be replaced by other atoms, including but not limited to O, N, S, P, B, and halogen atoms. The length and structure of X are not otherwise limited. In preferred embodiments of the present invention, X is a C1-C20 hydrocarbon group.

Nonlimiting examples of diol phosphinate esters include: 1,2-propanediol bis(diphenylphosphinate), 1,2-butanediol bis(diphenylphosphinate), 2,3-butanediol bis(diphenylphosphinate), 2,4-pentanediol bis(diphenylphosphinate), 3,5-heptanediol bis(diphenylphosphinate), 2,6-dimethyl-3,5-heptanediol bis(diphenylphosphinate), 6-methyl-2,4-heptanediol bis(diphenylphosphinate), 3-methyl-2,4-pentanediol bis(diphenylphosphinate), 3,3-dimethyl-2,4-pentanediol bis(diphenylphosphinate), 3-ethyl-2,4-pentanediol bis(diphenylphosphinate), 3-butyl-2,4-pentanediol bis(diphenylphosphinate), 3-allyl-2,4-pentanediol bis(diphenylphosphinate), 4-methyl-3,5-heptanediol bis(diphenylphosphinate), 2-ethyl-1,3-hexanediol bis(diphenylphosphinate), 2,2,4-trimethyl-1,3-pentanediol bis(diphenylphosphinate), 4-methyl-3,5-octanediol bis(diphenylphosphinate), 5-methyl-4,6-nonanediol bis(diphenylphosphinate), 1,3-propanediol bis(diphenylphosphinate), 1,3-diphenyl-1,3-propanediol bis(diphenylphosphinate), 2-methyl-1,3-diphenyl-1,3-propanediol bis(diphenylphosphinate), 2,2-dimethyl-1,3-diphenyl-1,3-propanediol bis(diphenylphosphinate), 2-methyl-1-phenyl-1,3-butanediol bis(diphenylphosphinate), 2,2,4,6,6-pentamethyl-3,5-hexanediol bis(diphenylphosphinate), 1,3-di-tert-butyl-2-ethyl-1,3-propanediol bis(diphenylphosphinate), 2-(2-furyl)-2-methyl-1,3-butanediol bis(diphenylphosphinate), 2-isoamyl-2-isopropyl-1,3-propanediol bis(diphenylphosphinate), 2,2-diisobutyl-1,3-propanediol bis(diphenylphosphinate), 1,3-diisopropyl-1,3-propanediol bis(diphenylphosphinate), 3-methyl-1-trifluoromethyl-2,4-pentanediol bis(diphenylphosphinate), 1,1,1-trifluoro-3-methyl-2,4-pentanediol bis(diphenylphosphinate), 4,4,4-trifluoro-1-(2-naphthyl)-1,3-butanediol bis(diphenylphosphinate), 2-ethyl-2-methyl-1,3-propanediol bis(diphenylphosphinate), 4,6-nonanediol bis(diphenylphosphinate), 2-amino-1-phenyl-1,3-propanediol bis(diphenylphosphinate), 2,2-dimethyl-1,3-propanediol bis(diphenylphosphinate), 3-butyl-3-methyl-2,4-pentanediol bis(diphenylphosphinate), 3,6-dimethyl-2,4-heptanediol bis(diphenylphosphinate), 2,2,6,6-tetramethyl-3,5-heptanediol bis(diphenylphosphinate), 2,3-diisopropyl-1,4-butanediol bis(diphenylphosphinate), 2,3-dimethyl-1,4-butanediol bis(diphenylphosphinate), 2,3-diethyl-1,4-butanediol bis(diphenylphosphinate), 2,3-dibutyl-1,4-butanediol bis(diphenylphosphinate), 2,5-hexanediol bis(diphenylphosphinate), 2,5-dimethyl-2,5-hexanediol bis(diphenylphosphinate), 2,5-dimethyl-2,5-hexanediol bis(diphenylphosphinate), 2,5-dimethyl-hex-3-yne-2,5-diol bis(diphenylphosphinate), hex-3-yne-2,5-diol bis(diphenylphosphinate), 2,2-dimethyl-1,5-pentanediol bis(diphenylphosphinate), 2,6-dimethyl-2,6-heptanediol bis(diphenylphosphinate), 1,2-ethylene glycol benzoate diphenylphosphinate, 1,2-propanediol benzoate diphenylphosphinate, 1,2-butanediol benzoate diphenylphosphinate, 2,3-butanediol benzoate diphenylphosphinate, 2,4-pentanediol benzoate diphenylphosphinate, 3,5-heptanediol benzoate diphenylphosphinate, 2,6-dimethyl-3,5-heptanediol benzoate diphenylphosphinate, 6-methyl-2,4-heptanediol benzoate diphenylphosphinate, 3-methyl-2,4-pentanediol benzoate diphenylphosphinate, 3,3-dimethyl-2,4-pentanediol benzoate diphenylphosphinate, 3-ethyl-2,4-pentanediol benzoate diphenylphosphinate, 3-butyl-2,4-pentanediol benzoate diphenylphosphinate, 3-allyl-2,4-pentanediol benzoate diphenylphosphinate, 4-methyl-3,5-heptanediol benzoate diphenylphosphinate, 2-ethyl-1,3-hexanediol benzoate diphenylphosphinate, 2,2,4-trimethyl-1,3-pentanediol benzoate diphenylphosphinate, 4-methyl-3,5-octanediol benzoate diphenylphosphinate, 5-methyl-4,6-nonanediol benzoate diphenylphosphinate, 1,3-propanediol benzoate diphenylphosphinate, 1,3-diphenyl-1,3-propanediol benzoate diphenylphosphinate, 2-methyl-1,3-diphenyl-1,3-propanediol benzoate diphenylphosphinate, 2,2-dimethyl-1,3-diphenyl-1,3-propanediol benzoate diphenylphosphinate, 2-methyl-1-phenyl-1,3-butanediol benzoate diphenylphosphinate, 2,2,4,6,6-pentamethyl-3,5-hexanediol benzoate diphenylphosphinate, 1,3-di-tert-butyl-2-ethyl-1,3-propanediol benzoate diphenylphosphinate, 2-(2-furyl)-2-methyl-1,3-butanediol benzoate diphenylphosphinate, 2-isoamyl-2-isopropyl-1,3-propanediol benzoate diphenylphosphinate, 2,2-diisobutyl-1,3-propanediol benzoate diphenylphosphinate, 1,3-diisopropyl-1,3-propanediol benzoate diphenylphosphinate, 3-methyl-1-trifluoromethyl-2,4-pentanediol benzoate diphenylphosphinate, 1,1,1-trifluoro-3-methyl-2,4-pentanediol benzoate diphenylphosphinate, 4,4,4-trifluoro-1-(2-naphthyl)-1,3-butanediol benzoate diphenylphosphinate, 2-ethyl-2-methyl-1,3-propanediol benzoate diphenylphosphinate, 4,6-nonanediol benzoate diphenylphosphinate, 2-amino-1-phenyl-1,3-propanediol benzoate diphenylphosphinate, 2,2-dimethyl-1,3-propanediol benzoate diphenylphosphinate, 3-butyl-3-methyl-2,4-pentanediol benzoate diphenylphosphinate, 3,6-dimethyl-2,4-heptanediol benzoate diphenylphosphinate, 2,2,6,6-tetramethyl-3,5-heptanediol benzoate diphenylphosphinate, 2,3-diisopropyl-1,4-butanediol benzoate diphenylphosphinate, 2,3-dimethyl-1,4-butanediol benzoate diphenylphosphinate, 2,3-diethyl-1,4-butanediol benzoate diphenylphosphinate, 2,3-dibutyl-1,4-butanediol benzoate diphenylphosphinate, 2,5-hexanediol benzoate diphenylphosphinate, 2,5-dimethyl-2,5-hexanediol benzoate diphenylphosphinate, 2,5-dimethyl-hex-3-yne-2,5-diol benzoate diphenylphosphinate, hex-3-yne-2,5-diol benzoate diphenylphosphinate, 2,2-dimethyl-1,5-pentanediol benzoate diphenylphosphinate, and 2,6-dimethyl-2,6-heptanediol benzoate diphenylphosphinate.

In another preferred embodiment of the present invention, the non-phthalate compounds are diol sulfonates as described in Formula 6 and Formula 7:

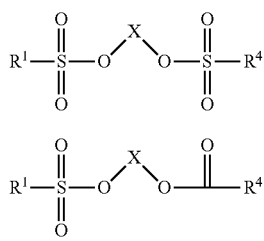

[Formula 6]

[Formula 7]

wherein $R^1$ and $R^4$ are as defined in [Formula 1], with proviso that the functional groups L and Q are sulfonates or carboxylic esters.

In this preferred embodiment, $R^1$ and $R^4$ are halogen, alkyl, substituted alkyl, cyclo-alkyl, aryl, arylalkyl, alkylaryl, alkenyl, cycloalkyl or heterocycles. The length and structure of $R^1$ and $R^2$ are not otherwise limited. The said $R^1$ and $R^4$ groups may also join to each other and/or to group X to form cycles.

X is selected from an aliphatic hydrocarbon group, an alicyclic hydrocarbon group, an aromatic hydrocarbon group, or a polycyclic hydrocarbon group, in which one or more H and C atoms may be replaced by other atoms, including but not limited to O, N, S, P, B, and halogen atoms. The length and structure of X are not otherwise limited. In preferred embodiments of the present invention, X is a C1-C20 hydrocarbon group.

Nonlimiting examples of diol sulfonates include: 1,2-ethylene glycol dibenzenesulfonate, 1,2-propanediol dibenzenesulfonate, 1,2-butanediol dibenzenesulfonate, 2,3-butanediol dibenzenesulfonate, 2,4-pentanediol dibenzenesulfonate, 3,5-heptanediol dibenzenesulfonate, 2,6-dimethyl-3,5-heptanediol dibenzenesulfonate, 6-methyl-2,4-heptanediol dibenzenesulfonate, 3-methyl-2,4-pentanediol dibenzenesulfonate, 3,3-dimethyl-2,4-pentanediol dibenzenesulfonate, 3-ethyl-2,4-pentanediol dibenzenesulfonate, 3-butyl-2,4-pentanediol dibenzenesulfonate, 3-allyl-2,4-pentanediol dibenzenesulfonate, 4-methyl-3,5-heptanediol dibenzenesulfonate, 2-ethyl-1,3-hexanediol dibenzenesulfonate, 2,2,4-trimethyl-1,3-pentanediol dibenzenesulfonate, 4-methyl-3,5-octanediol dibenzenesulfonate, 5-methyl-4,6-nonanediol dibenzenesulfonate, 1,3-propanediol dibenzenesulfonate, 1,3-diphenyl-1,3-propanediol dibenzenesulfonate, 2-methyl-1,3-diphenyl-1,3-propanediol dibenzenesulfonate, 2,2-dimethyl-1,3-diphenyl-1,3-propanediol dibenzenesulfonate, 2-methyl-1-phenyl-1,3-butanediol dibenzenesulfonate, 2,2,4,6,6-pentamethyl-3,5-hexanediol dibenzenesulfonate, 1,3-di-tert-butyl-2-ethyl-1,3-propanediol dibenzenesulfonate, 2-(2-furyl)-2-methyl-1,3-butanediol dibenzenesulfonate, 2-isoamyl-2-isopropyl-1,3-propanediol dibenzenesulfonate, 2,2-diisobutyl-1,3-propanediol dibenzenesulfonate, 1,3-diisopropyl-1,3-propanediol dibenzenesulfonate, 3-methyl-1-trifluoromethyl-2,4-pentanediol dibenzenesulfonate, 1,1,1-trifluoro-3-methyl-2,4-pentanediol dibenzenesulfonate, 4,4,4-trifluoro-1-(2-naphthyl)-1,3-butanediol dibenzenesulfonate, 2-ethyl-2-methyl-1,3-propanediol dibenzenesulfonate, 4,6-nonanediol dibenzenesulfonate, 2-amino-1-phenyl-1,3-propanediol dibenzenesulfonate, 2,2-dimethyl-1,3-propanediol dibenzenesulfonate, 3-butyl-3-methyl-2,4-pentanediol dibenzenesulfonate, 3,6-dimethyl-2,4-heptanediol dibenzenesulfonate, 2,2,6,6-tetramethyl-3,5-heptanediol dibenzenesulfonate, 2,3-diisopropyl-1,4-butanediol dibenzenesulfonate, 2,3-dimethyl-1,4-butanediol dibenzenesulfonate, 2,3-diethyl-1,4-butanediol dibenzenesulfonate, 2,3-dibutyl-1,4-butanediol dibenzenesulfonate, 2,5-hexanediol dibenzenesulfonate, 2,5-dimethyl-2,5-hexanediol dibenzenesulfonate, 2,5-dimethyl-hex-3-yne-2,5-diol dibenzenesulfonate, hex-3-yne-2,5-diol dibenzenesulfonate, 2,2-dimethyl-1,5-pentanediol dibenzenesulfonate, 2,6-dimethyl-2,6-heptanediol dibenzenesulfonate, 1,2-ethylene glycol benzoate benzenesulfonate, 1,2-propanediol benzoate benzenesulfonate, 1,2-butanediol benzoate benzenesulfonate, 2,3-butanediol benzoate benzenesulfonate, 2,4-pentanediol benzoate benzenesulfonate, 3,5-heptanediol benzoate benzenesulfonate, 2,6-dimethyl-3,5-heptanediol benzoate benzenesulfonate, 6-methyl-2,4-heptanediol benzoate benzenesulfonate, 3-methyl-2,4-pentanediol benzoate benzenesulfonate, 3,3-dimethyl-2,4-pentanediol benzoate benzenesulfonate, 3-ethyl-2,4-pentanediol benzoate benzenesulfonate, 3-butyl-2,4-pentanediol benzoate benzenesulfonate, 3-allyl-2,4-pentanediol benzoate benzenesulfonate, 4-methyl-3,5-heptanediol benzoate benzenesulfonate, 2-ethyl-1,3-hexanediol benzoate benzenesulfonate, 2,2,4-trimethyl-1,3-pentanediol benzoate benzenesulfonate, 4-methyl-3,5-octanediol benzoate benzenesulfonate, 5-methyl-4,6-nonanediol benzoate benzenesulfonate, 1,3-propanediol benzoate benzenesulfonate, 1,3-diphenyl-1,3-propanediol benzoate benzenesulfonate, 2-methyl-1,3-diphenyl-1,3-propanediol benzoate benzenesulfonate, 2,2-dimethyl-1,3-diphenyl-1,3-propanediol benzoate benzenesulfonate, 2-methyl-1-phenyl-1,3-butanediol benzoate benzenesulfonate, 2,2,4,6,6-pentamethyl-3,5-hexanediol benzoate benzenesulfonate, 1,3-di-tert-butyl-2-ethyl-1,3-propanediol benzoate benzenesulfonate, 2-(2-furyl)-2-methyl-1,3-butanediol benzoate benzenesulfonate, 2-isoamyl-2-isopropyl-1,3-propanediol benzoate benzenesulfonate, 2,2-diisobutyl-1,3-propanediol benzoate benzenesulfonate, 1,3-diisopropyl-1,3-propanediol benzoate benzenesulfonate, 3-methyl-1-trifluoromethyl-2,4-pentanediol benzoate benzenesulfonate, 1,1,1-trifluoro-3-methyl-2,4-pentanediol benzoate benzenesulfonate, 4,4,4-trifluoro-1-(2-naphthyl)-1,3-butanediol benzoate benzenesulfonate, 2-ethyl-2-methyl-1,3-propanediol benzoate benzenesulfonate, 4,6-nonanediol benzoate benzenesulfonate, 2-amino-1-phenyl-1,3-propanediol benzoate benzenesulfonate, 2,2-dimethyl-1,3-propanediol benzoate benzenesulfonate, 3-butyl-3-methyl-2,4-pentanediol benzoate benzenesulfonate, 3,6-dimethyl-2,4-heptanediol benzoate benzenesulfonate, 2,2,6,6-tetramethyl-3,5-heptanediol benzoate benzenesulfonate, 2,3-diisopropyl-1,4-butanediol benzoate benzenesulfonate, 2,3-dimethyl-1,4-butanediol benzoate benzenesulfonate, 2,3-diethyl-1,4-butanediol benzoate benzenesulfonate, 2,3-dibutyl-1,4-butanediol benzoate benzenesulfonate, 2,5-hexanediol benzoate benzenesulfonate, 2,5-dimethyl-2,5-hexanediol benzoate benzenesulfonate, 2,5-dimethyl-hex-3-yne-2,5-diol benzoate benzenesulfonate, hex-3-yne-2,5-diol benzoate benzenesulfonate, 2,2-dimethyl-1,5-pentanediol benzoate benzenesulfonate, and 2,6-dimethyl-2,6-heptanediol benzoate benzenesulfonate.

In another preferred embodiment of the present invention, the non-phthalate compounds are alpha-keto acid esters as described in Formula 8 and Formula 9:

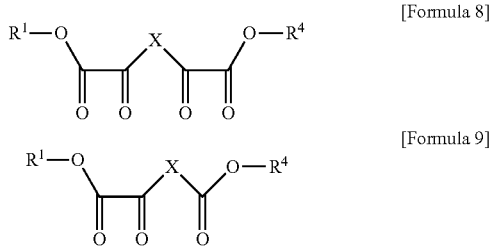

[Formula 8]

[Formula 9]

wherein $R^1$ and $R^4$ are as defined in Formula 1, with proviso that the functional groups L and Q are alpha-keto acid esters or carboxylic ester.

In this preferred embodiment, $R^1$ and $R^4$ are halogen, alkyl, substituted alkyl, cyclo-alkyl, aryl, arylalkyl, alkylaryl, alkenyl, cycloalkyl or heterocycles. The length and structure of $R^1$ and $R^2$ are not otherwise limited. The said $R^1$ and $R^4$ groups may also join to each other and/or to group X to form cycles.

X is selected from an aliphatic hydrocarbon group, an alicyclic hydrocarbon group, an aromatic hydrocarbon group, or a polycyclic hydrocarbon group, in which one or more H and C atoms may be replaced by other atoms, including but not limited to O, N, S, P, B, and halogen atoms. The length and structure of X are not otherwise limited. In preferred embodiments of the present invention, X is a C1-C20 hydrocarbon group.

Nonlimiting examples of alpha-keto acid esters include: 2,3-dioxobutanedioic acid dimethyl ester, 2,3-dioxobutanedioic acid dipropyl ester, 2,3-dioxobutanedioic acid diisopropyl ester, 2,3-dioxobutanedioic acid dibutyl ester, 2,3-dioxobutanedioic acid diisobutyl ester, 2,3-dioxobutanedioic acid disec-butyl ester, 2,3-dioxobutanedioic acid dit-butyl ester, 2,3-dioxobutanedioic acid dipentyl ester, 2,3-dioxobutanedioic acid diisopentyl ester, 2,3-dioxobutanedioic acid di1,1,1-trifluoro-2-propyl ester, 2,4-dioxopentanedioic acid dimethyl ester, 2,4-dioxopentanedioic acid diethyl ester, 2,4-dioxopentanedioic acid dipropyl ester, 2,4-dioxopentanedioic acid diisopropyl ester, 2,4-dioxopentanedioic acid dibutyl ester, 2,4-dioxopentanedioic acid diisobutyl ester, 2,4-dioxopentanedioic acid disec-butyl ester, 2,4-dioxopentanedioic acid dit-butyl ester, 2,4-dioxopentanedioic acid dipentyl ester, 2,4-dioxopentanedioic acid diisopentyl ester, 2,4-dioxopentanedioic acid di1,1,1-trifluoro-2-propyl ester, 2,5-dioxohexanedioic acid dimethyl ester, 2,5-dioxohexanedioic acid diethyl ester, 2,5-dioxohexanedioic acid dipropyl ester, 2,5-dioxohexanedioic acid diisopropyl ester, 2,5-dioxohexanedioic acid dibutyl ester, 2,5-dioxohexanedioic acid diisobutyl ester, 2,5-dioxohexanedioic acid disec-butyl ester, 2,5-dioxohexanedioic acid dit-butyl ester, 2,5-dioxohexanedioic acid dipentyl ester, 2,5-dioxohexanedioic acid diisopentyl ester, 2,5-dioxohexanedioic acid di1,1,1-trifluoro-2-propyl ester, 4-methyl-2,6-dioxoheptanedioic acid dimethyl ester, 4-methyl-2,6-dioxoheptanedioic acid diethyl ester, 4-methyl-2,6-dioxoheptanedioic acid dipropyl ester, 4-methyl-2,6-dioxoheptanedioic acid diisopropyl ester, 4-methyl-2,6-dioxoheptanedioic acid dibutyl ester, 4-methyl-2,6-dioxoheptanedioic acid diisobutyl ester, 4-methyl-2,6-dioxoheptanedioic acid disec-butyl ester, 4-methyl-2,6-dioxoheptanedioic acid dit-butyl ester, 4-methyl-2,6-dioxoheptanedioic acid dipentyl ester, 4-methyl-2,6-dioxoheptanedioic acid diisopentyl ester, 4-methyl-2,6-dioxoheptanedioic acid di1,1,1-trifluoro-2-propyl ester, methyl 2-[(methoxycarbonyl)carbonyl]benzoate, ethyl 2-[(ethoxycarbonyl) carbonyl]benzoate, propyl 2-[(propoxycarbonyl) carbonyl]benzoate, isopropyl 2-[(isopropoxycarbonyl) carbonyl]benzoate, butyl 2-[(butoxycarbonyl) carbonyl]benzoate, isobutyl 2-[(isobutoxycarbonyl) carbonyl]benzoate, t-butyl 2-[(t-butoxycarbonyl) carbonyl] benzoate, pentyl 2-[(pentyloxycarbonyl)carbonyl]benzoate, and isopentyl 2-[(isopentyloxycarbonyl)carbonyl]benzoate.

In another preferred embodiment of the present invention, the non-phthalate compounds are phosphinates as described in Formula 10:

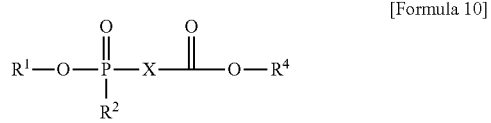

[Formula 10]

wherein $R^1$, $R^2$ and $R^4$ are as defined in Formula 1, with proviso that the functional groups L and Q are phosphinate and carboxylic ester, separately.

In this preferred embodiment, $R^1$, $R^2$ and $R^4$ are halogen, alkyl, substituted alkyl, cyclo-alkyl, aryl, arylalkyl, alkylaryl, alkenyl, cycloalkyl or heterocycles. The length and structure of $R^1$ and $R^2$ are not otherwise limited. The said $R^1$, $R^2$ and $R^4$ groups may also join to each other and/or to group X to form cycles.

X is selected from an aliphatic hydrocarbon group, an alicyclic hydrocarbon group, an aromatic hydrocarbon group, or a polycyclic hydrocarbon group, in which one or more H and C atoms may be replaced by other atoms, including but not limited to O, N, S, P, B, and halogen atoms. The length and structure of X are not otherwise limited. In preferred embodiments of the present invention, X is a C1-C20 hydrocarbon group.

Nonlimiting examples of phosphinates include: 2-(ethoxyethylphosphinyl)-acetic acid ethyl ester, 2-(propoxyethylphosphinyl)-acetic acid propyl ester, 2-(isopropoxyethylphosphinyl)-acetic acid isopropyl ester, 2-(butoxyethylphosphinyl)-acetic acid butyl ester, 2-(isobutoxyethylphosphinyl)-acetic acid isobutyl ester, 2-(t-butoxyethylphosphinyl)-acetic acid t-butyl ester, 2-(pentyloxyethylphosphinyl)-acetic acid pentyl ester, 2-(isopentyloxyethylphosphinyl)-acetic acid isopentyl ester, 2-(ethoxyphenylphosphinyl)-acetic acid ethyl ester, 2-(propoxyphenylphosphinyl)-acetic acid propyl ester, 2-(isopropoxyphenylphosphinyl)-acetic acid isopropyl ester, 2-(butoxyphenylphosphinyl)-acetic acid butyl ester, 2-(isobutoxyphenylphosphinyl)-acetic acid isobutyl ester, 2-(t-butoxyphenylphosphinyl)-acetic acid t-butyl ester, 2-(pentyloxyphenylphosphinyl)-acetic acid pentyl ester, 2-(isopentyloxyphenylphosphinyl)-acetic acid isopentyl ester, 3-(ethoxyethylphosphinyl)-propanoic acid ethyl ester, 3-(propoxyethylphosphinyl)-propanoic acid propyl ester, 3-(isopropoxyethylphosphinyl)-propanoic acid isopropyl ester, 3-(butoxyethylphosphinyl)-propanoic acid butyl ester, 3-(isobutoxyethylphosphinyl)-propanoic acid isobutyl ester, 3-(t-butoxyethylphosphinyl)-propanoic acid t-butyl ester, 3-(pentyloxyethylphosphinyl)-propanoic acid pentyl ester, 3-(isopentyloxyethylphosphinyl)-propanoic acid isopentyl ester, 3-(ethoxyphenylphosphinyl)-propanoic acid ethyl ester, 3-(propoxyphenylphosphinyl)-propanoic acid propyl ester, 3-(isopropoxyphenylphosphinyl)-propanoic acid isopropyl ester, 3-(butoxyphenylphosphinyl)-propanoic acid butyl ester, 3-(isobutoxyphenylphosphinyl)-propanoic acid isobutyl ester, 3-(t-butoxyphenylphosphinyl)-propanoic acid t-butyl ester, 3-(pentyloxyphenylphosphinyl)-propanoic acid pentyl ester, 3-(isopentyloxyphenylphosphinyl)-propanoic acid isopentyl ester, 3-(ethoxyethylphosphinyl)-2-methyl-propanoic acid ethyl ester, 3-(propoxyethylphosphinyl)-2-methyl-propanoic acid propyl ester, 3-(isopropoxyethylphosphinyl)-2-methyl-propanoic acid isopropyl ester, 3-(butoxyethylphosphinyl)-2-methyl-propanoic acid butyl ester, 3-(isobutoxyethylphosphinyl)-2-methyl-propanoic acid isobutyl ester, 3-(t-butoxyethylphosphinyl)-2-methyl-propanoic acid t-butyl ester, 3-(pentyloxyethylphosphinyl)-2-methyl-propanoic acid pentyl ester, 3-(isopentyloxyethylphosphinyl)-2-methyl-propanoic acid isopentyl ester, 3-(ethoxyphenylphosphinyl)-2-methyl-propanoic acid ethyl ester, 3-(propoxyphenylphosphinyl)-2-methyl-propanoic acid propyl ester, 3-(isopropoxyphenylphosphinyl)-2-methyl-propanoic acid isopropyl ester, 3-(butoxyphenylphosphinyl)-2-methyl-propanoic acid butyl ester, 3-(isobutoxyphenylphosphinyl)-2-methyl-propanoic acid isobutyl ester, 3-(t-butoxyphenylphosphinyl)-2-methyl-propanoic acid t-butyl ester, 3-(pentyloxyphenylphosphinyl)-2-methyl-propanoic acid pentyl ester, 3-(isopentyloxyphenylphosphinyl)-2-methyl-propanoic acid isopentyl ester, 2-(ethoxyethylphosphinyl)-benzoic acid ethyl ester, 2-(propoxyethylphosphinyl)-benzoic acid propyl ester, 2-(isopropoxyethylphosphinyl)-benzoic acid isopropyl ester, 2-(butoxyethylphosphinyl)-benzoic acid butyl ester, 2-(isobutoxyethylphosphinyl)-benzoic acid isobutyl ester, 2-(t-butoxyethylphosphinyl)-benzoic acid t-butyl ester, 2-(pentyloxyethylphosphinyl)-benzoic acid pentyl ester, and 2-(isopentyloxyethylphosphinyl)-benzoic acid isopentyl ester In another preferred embodiment of the present invention, the non-phthalate compounds are sulfonates as described in Formula 11 and Formula 12:

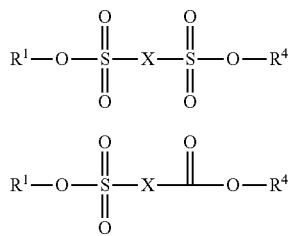

[Formula 11]

[Formula 12]

wherein $R^1$ and $R^4$ are as defined in Formula 1, with proviso that the functional groups L and Q are sulfonates or carboxylic ester.

In this preferred embodiment, $R^1$ and $R^4$ are halogen, alkyl, substituted alkyl, cyclo-alkyl, aryl, arylalkyl, alkylaryl, alkenyl, cycloalkyl or heterocycles. The length and structure of $R^1$ and $R^2$ are not otherwise limited. The said $R^1$ and $R^4$ groups may also join to each other and/or to group X to form cycles.

X is selected from an aliphatic hydrocarbon group, an alicyclic hydrocarbon group, an aromatic hydrocarbon group, or a polycyclic hydrocarbon group, in which one or more H and C atoms may be replaced by other atoms, including but not limited to O, N, S, P, B, and halogen atoms. The length and structure of X are not otherwise limited. In preferred embodiments of the present invention, X is a C1-C20 hydrocarbon group.

Nonlimiting examples of sulfonates include: methanedisulfonic acid dimethyl ester, methanedisulfonic acid diethyl ester, methanedisulfonic acid dipropyl ester, methanedisulfonic acid diisopropyl ester, methanedisulfonic acid dibutyl ester, methanedisulfonic acid diisobutyl ester, methanedisulfonic acid disec-butyl ester, methanedisulfonic acid dit-butyl ester, methanedisulfonic acid dipentyl ester, methanedisulfonic acid diisopentyl ester, 1,2-ethanedisulfonic acid dimethyl ester, 1,2-ethanedisulfonic acid diethyl ester, 1,2-ethanedisulfonic acid dipropyl ester, 1,2-ethanedisulfonic acid diisopropyl ester, 1,2-ethanedisulfonic acid dibutyl ester, 1,2-ethanedisulfonic acid diisobutyl ester, 1,2-ethanedisulfonic acid disec-butyl ester, 1,2-ethanedisulfonic acid dit-butyl ester, 1,2-ethanedisulfonic acid dipentyl ester, 1,2-ethanedisulfonic acid diisopentyl ester, 1,3-propanedisulfonic acid dimethyl ester, 1,3-propanedisulfonic acid diethyl ester, 1,3-propanedisulfonic acid dipropyl ester, 1,3-propanedisulfonic acid diisopropyl ester, 1,3-propanedisulfonic acid dibutyl ester, 1,3-propanedisulfonic acid diisobutyl ester, 1,3-propanedisulfonic acid disec-butyl ester, 1,3-propanedisulfonic acid dit-butyl ester, 1,3-propanedisulfonic acid dipentyl ester, 1,3-propanedisulfonic acid diisopentyl ester, 1,2-benzenedisulfonic acid dimethyl ester, 1,2-benzenedisulfonic acid diethyl ester, 1,2-benzenedisulfonic acid dipropyl ester, 1,2-benzenedisulfonic acid diisopropyl ester, 1,2-benzenedisulfonic acid dibutyl ester, 1,2-benzenedisulfonic acid diisobutyl ester, 1,2-benzenedisulfonic acid disec-butyl ester, 1,2-benzenedisulfonic acid dit-butyl ester, 1,2-benzenedisulfonic acid dipentyl ester, 1,2-benzenedisulfonic acid diisopentyl ester, 2-(ethoxysulfonyl)-acetic acid ethyl ester, 2-(propoxysulfonyl)-acetic acid propyl ester, 2-(isopropoxysulfonyl)-acetic acid isopropyl ester, 2-(butoxysulfonyl)-acetic acid butyl ester, 2-(isobutoxysulfonyl)-acetic acid isobutyl ester, 2-(t-butoxy sulfonyl)-acetic acid t-butyl ester, 2-(pentyloxysulfonyl)-acetic acid pentyl ester, 2-(isopentyloxysulfonyl)-acetic acid isopentyl ester, 2-(ethoxysulfonyl)-propanoic acid ethyl ester, 2-(propoxysulfonyl)-propanoic acid propyl ester, 2-(isopropoxysulfonyl)-propanoic acid isopropyl ester, 2-(butoxysulfonyl)-propanoic acid butyl ester, 2-(isobutoxysulfonyl)-propanoic acid isobutyl ester, 2-(t-butoxy sulfonyl)-propanoic acid t-butyl ester, 2-(pentyloxysulfonyl)-propanoic acid pentyl ester, 2-(isopentyloxysulfonyl)-propanoic acid isopentyl ester, 2-(ethoxysulfonyl)-benzoic acid ethyl ester, 2-(propoxysulfonyl)-benzoic acid propyl ester, 2-(isopropoxysulfonyl)-benzoic acid isopropyl ester, 2-(butoxysulfonyl)-benzoic acid butyl ester, 2-(isobutoxysulfonyl)-benzoic acid isobutyl ester, 2-(t-butoxy sulfonyl)-benzoic acid t-butyl ester, 2-(pentyloxysulfonyl)-benzoic acid pentyl ester, and 2-(isopentyloxysulfonyl)-benzoic acid isopentyl ester.

In another preferred embodiment of the present invention, the non-phthalate compounds are carbothioic acid diesters as described in Formula 13 and Formula 14:

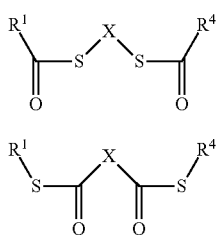

[Formula 13]

[Formula 14]

wherein $R^1$ and $R^4$ are as defined in Formula 1, with proviso that the functional groups L and Q are carbothioic acid esters.

In this preferred embodiment, $R^1$ and $R^4$ are halogen, alkyl, substituted alkyl, cyclo-alkyl, aryl, arylalkyl, alkylaryl, alkenyl, cycloalkyl or heterocycles. The length and structure of $R^1$ and $R^4$ are not otherwise limited. The said $R^1$ and $R^4$ groups may also join to each other and/or to group X to form cycles.

X is selected from an aliphatic hydrocarbon group, an alicyclic hydrocarbon group, an aromatic hydrocarbon group, or a polycyclic hydrocarbon group, in which one or more H and C atoms may be replaced by other atoms, including but not limited to O, N, S, P, B, and halogen atoms. The length and structure of X are not otherwise limited. In preferred embodiments of the present invention, X is a C1-C20 hydrocarbon group.

Nonlimiting examples of carbothioic acid diesters include: S,S'-ethane-1,2-diyl dibenzenecarbothioate, S,S'-butane-2,3-diyl dibenzenecarbothioate, S,S'-propane-1,3-diyl dibenzenecarbothioate, 1,2-benzenedicarbothioic acid, S,S-diethyl ester, 1,2-benzenedicarbothioic acid, S,S-dipropyl ester, 1,2-benzenedicarbothioic acid, S,S-dibutyl ester, and 1,2-benzenedicarbothioic acid, S,S-diisobutyl ester.

The present invention provides a catalyst system for the polymerization of $CH_2$=CHR, in which R is hydrogen or a hydrocarbyl radical with $C_{1-12}$ carbon atoms, comprising the product of the reaction between: (a) a solid catalyst component comprising a Mg, Ti and halogen and an electron donor selected from non-phthalate compounds as described in Formula 1; (b) organoaluminium compounds; and (c) one or more electron-donor compounds (external donors).

The solid catalyst component for the polymerization of olefins according to the present invention preferably comprises a reaction product of titanium compounds, magnesium compound, and a non-phthalate compound selected from compounds of Formula 1.

Examples of magnesium halide compounds that may also be used in the present invention are magnesium fluoride, magnesium chloride, magnesium bromide, magnesium iodide, magnesium acetate, magnesium nitrate, magnesium perchlorate, and magnesium sulfate. Besides those magnesium compounds, complex compounds or double compounds of these magnesium compounds can be used with other metal salt compounds, or mixtures of these magnesium compounds with other metal salt compounds. The compositions obtained according to the aforementioned processes in the preparation of the catalyst component may be further brought into contact one or more times with the titanium compound, and also may be washed with an organic solvent.

The catalyst component of the present invention is prepared by contacting magnesium complex with a titanium compound of the general formula $Ti(OR)_lX'_{4-l}$, wherein X' is a halogen atom; R is a hydrocarbon group having from 1 to 10 carbon atoms, and l is an integer from 0 to 4. Titanium compounds of the general formula $Ti(OR)_lX'_{4-l}$ can also be employed for the present invention, such as:

[1] titanium tetrahalides, such as $TiCl_4$, $TiBr_4$ and $TiI_4$;
[2] alkoxytitanium trihalides, such as $Ti(OCH_3)Cl_3$, $Ti(OC_2H_5)Cl_3$, $Ti(O$-n-$C_4H_9)Cl_3$, $Ti(OC_2H_5)Br_3$ and $Ti(O$-iso-$C_4H_9)Br_3$;
[3] dialkoxytitanium dihalides, such as $Ti(OCH_3)_2Cl_2$, $Ti(OC_2H_5)_2Cl_2$, $Ti(O$-n-$C_4H_9)_2Cl_2$, and $Ti(OC_2H_5)_2Br_2$;
[4] trialkoxytitanium monohalides, such as $Ti(OCH_3)_3Cl$, $Ti(OC_2H_5)_3Cl$, $Ti(O$-n-$C_4H_9)_3Cl$ and $Ti(OC_2H_5)_3Br$;
[5] tetraalkoxytitaniums, such as $Ti(OCH_3)_4$, $Ti(OC_2H_5)_4$, $Ti(O$-n-$C_4H_9)_4$, $Ti(O$-iso-$C_4H_9)_4$ and $Ti(O$-2-ethylhexyl); and
[6] other compounds such as $Ti[O$—$C(CH_3)CH$—$CO$—$CH]_2$ $Cl_2$, $Ti[N(C_2H_5)_2]Cl_3$, $Ti[N(C_6H_5)_2]Cl_3$, $Ti(C_6H_5COO)Cl_3$, $[N(C_4H_9)_4]_2TiCl_6$, $[N(CH_3)_4]Ti_2Cl_9$, $TiBr_4$, $TiCl_3OSO_2C_6H_5$, and $LiTi(OC_3H_7)_2Cl_3$.

Silicon compounds represented by the general formulae $SiR_j(OR')_{4-j}$ and $SiR_j(NR_2')_{4-j}$, can also be used as an external electron donor, wherein R is hydrogen, an alkyl group, or an aryl group; R' is an alkyl group or aryl group; and m is may be 0-4. Of those, especially preferred are alkoxy groups having nitrogen-containing organosilicon compounds. Specific examples of these compounds include, but are not limited to, trimethylmethoxysilane, triethylmethoxysilane, dimethyldimethoxysilane, dimethyldiethoxysilane, diphenyldimethoxysilane, dimethyldiethoxysilane, diphenyldimethoxysilane, diphenyldiethoxysilane, dicyclohexyldimethoxysilane, cyclohexylmethyldimethoxysilane, cyclohexyl-iso-butyldimethoxysilane, cyclohexyl-1,1,2-trimethylpropyldimethoxysilane, α-naphthyl-1,1,2-trimethylpropyldimethoxysilane, n-tetradecanyl-1,1,2-trimethylpropyldimethoxysilane, cyclopentylmethyldimethoxysilane, cyclopentylethyldimethoxysilane, cyclopentylpropyldimethoxysilane, cyclopentyl-t-butyldimethoxysilane, cyclopentyl-1,1,2-trimethylpropyldimethoxysilane, dicyclopentyldimethoxysilane, cyclopentylcyclohexyldimethoxysilane, t-butylmethyldimethoxysilane, t-butylethyldimethoxysilane, t-butylpropyldimethoxysilane, di-t-butyldimethoxysilane, diisopropyldimethoxysilane, isopropylisobutyldimethoxysilane, γ-chloropropyltrimethoxysilane, methyltriethoxysilane, ethyltriethoxysilane, vinyltriethoxysilane, butyltriethoxysilane, phenyltriethoxysilane, γ-aminopropyltriethoxysilane, chlorotriethoxysilane, ethyltriisopropoxysilane, vinyltributoxysilane, methyl-t-butoxydimethoxysilane, isopropyl-t-butoxydimethoxysilane, cyclopentyl-t-butoxydimethoxysilane, 1,1,2-trimethylpropyltrimethoxysilane, tetraethyl silicate, tetrabutyl silicate, trimethylphenoxysilane, methyltrialloxysilane, vinyltris(β-methoxyethoxy)silane, vinyltrisacetoxysilane, dimethyltetraethoxydisiloxane, 4,9-di-tert-butyl-1,6-dioxa-4,9-diaza-5-sila-spiro[4.4]nonane, 4,9-dibutyl-1,6-dioxa-4,9-diaza-5-sila-spiro[4.4]nonane, 4,9-diethyl-1,6-dioxa-4,9-diaza-5-sila-spiro[4.4]nonane, 4,9-diphenyl-1,6-dioxa-4,9-diaza-5-sila-spiro[4.4]nonane, 4,9-dibenzyl-1,6-dioxa-4,9-diaza-5-sila-spiro[4.4]nonane, 5,11-dimethyl-2,8-diphenyl-1,7-dioxa-5,11-diaza-6-sila-spiro[5.5]undecane, 4,9-di-tert-butyl-2,7-diphenyl-1,6-dioxa-4,9-diaza-5-sila-spiro[4.4]nonane, 4,9-diisopropyl-2,3,7,8-tetraphenyl-1,6-dioxa-4,9-diaza-5-sila-spiro[4.4]nonane, 4,9-di-tert-butyl-1,6-dioxa-4,9-diaza-5-sila-spiro[4.4]nonane, 4,9-dibutyl-1,6-dioxa-4,9-diaza-5-sila-spiro[4.4]nonane, 4,9-diethyl-1,6-dioxa-4,9-diaza-5-sila-spiro[4.4]nonane, 4,9-diphenyl-1,6-dioxa-4,9-diaza-5-sila-spiro[4.4]nonane, 4,9-dibenzyl-1,6-dioxa-4,9-diaza-5-sila-spiro[4.4]nonane, 5,11-dimethyl-2,8-diphenyl-1,7-dioxa-5,11-diaza-6-sila-spiro[5.5]undecane, 4,9-di-tert-butyl-2,7-diphenyl-1,6-dioxa-4,9-diaza-5-sila-spiro[4.4]nonane, and 4,9-diisopropyl-2,3,7,8-tetraphenyl-1,6-dioxa-4,9-diaza-5-sila-spiro[4.4]nonane. One or more of these organosilicon compounds may be used herein either singly or as combined.

Organoaluminium compounds of the present invention consists of any of alkyl groups, halogen atoms, hydrogen atoms and alkoxy groups, aluminoxanes, and their mixtures. They may include trialkylaluniniums such as trimethylaluminium, triethylaluminium, triisopropylaluminium, triisobutylaluminium, and trioctylaluminium; dialkylaluminium monochlorides such as diethylaluminium monochloride, diisopropylaluminium monochloride, diisobutylaluminium monochloride, and dioctylaluminium monochloride; alkylaluminium sesquihalides such as ethylaluminium sesquichloride; and linear aluninoxanes such as methylaluminoxanec. Preferred organoaluminiun compounds are trialkylalumniniums with lower alkyl groups each having from 1 to 5 carbon atoms, and more preferred are trimethylaluminium, triethylalumniniumn, triisopropylaluminium, and triisobutylaluminium. One or more of these organoaluminium compounds may be used either singly or as combined. Other acceptable organoaluminium compound (C) includes compounds containing two or more aluminum atoms linked to each other through hetero-atoms, such as: $(C_2H_5)_2Al-O-(C_2H_5)_2$; $(C_2H_5)_2Al-N(C_6H_5)-Al(C_2H_5)_2$; and $(C_2H_5)_2Al-O-SO_2-OAl(C_2H_5)_2$.

The catalyst component of present invention is not limited by polymerization process, and polymerization of olefins may be performed in the presence of, or in the absence of, an organic solvent. Olefin monomers may be used in the gaseous or liquid state depending on the polymerization as slurry, liquid or gas phase processes, or in a combination of liquid and gas phase processes using separate reactors, all of which can be done either by batch or continuously. The polyolefin may be directly obtained from gas phase process, or obtained by isolation and recovery of solvent from the slurry process, according to conventionally known methods. The olefin monomer can be added prior to, with, or after the addition of the Ziegler-Natta type catalyst system to the polymerization reactor.

The catalyst component of present invention is combined with the aforementioned silicon compound and an organoaluminium compound for the polymerization of olefins. The organoaluminium compound is used in a molar ratio of from 1 to 1000 per atom of titanium in the catalyst component, and the silicon compound is used in a molar ratio of less than 1, preferably from 0.005 to 0.5 per mole of the organoaluminium compound. The molecular weight of the polymers may be controlled by known methods, preferably by using hydrogen. With the catalyst component produced according to the present invention, molecular weight may be suitably controlled with hydrogen when the polymerization is carried out at relatively low temperatures, e.g., from about 30° C. to about 105° C. This control of molecular weight may be evidenced by a measurable positive change of the Melt Flow Rate (MFR).

There are no particular restrictions on the polymerization conditions for production of polyolefins by the methods of the present invention, such as the polymerization temperature, polymerization time, polymerization pressure, or monomer concentration. The polymerization temperature is generally from about 40° C. to about 90° C., and the polymerization pressure is generally one atmosphere or higher. The catalyst component of the present invention may be pre-contacted with small quantities of olefin monomer, well known in the art as pre-polymerization, in a hydrocarbon solvent at a temperature of about 60° C. or lower for a time sufficient to produce a quantity of polymer from about 0.5 to 3 times the weight of the catalyst. If such a pre-polymerization is done in liquid or gaseous monomer, the quantity of resultant polymer is generally up to 1000 times the catalyst weight.

Examples of olefins homo-polymerized or copolymerized by use the catalyst component of the present invention include olefins of the general formula $CH_2=CHR$, where R is H or $C_{1-12}$ straight or branched alkyl, such as ethylene, propylene, butene-1, pentene-1,4-methylpentene-1, octene-1, and the like. The catalyst component of present may be employed in the processes in which ethylene is polymerized and processes involving the homopolymerization or copolymerization of propylene are preferred. The olefin polymerization processes that may be used in accordance with the present invention are not generally limited.

EXAMPLES

To facilitate a better understanding of the present invention, the following examples of certain aspects of the present invention are given. In no way should the following examples be read to limit or define the entire scope of the invention.

GC/MS and $^1$H-NMR were used to characterize and determine the synthesized compounds. The instrument information is adopted here for reference.

The instrument GC/MS (Gas Chromatograph with Mass Spectrometry), with Chemstation software G1701BA version B.01.00 for data processing, is used to determine target compound and purity: Gas Chromatography: Agilent 5890 Series II Plus; Injector: Agilent 7673 Auto Injector; Mass Spectra Detector: Agilent 5989B.

The column was a Phenomenex ZB-5 ms 5% Polysilarylene and 95% Polydimethylsiloxane with dimensions of 30 meters length, 0.25 mm ID, and 1.00 micron film thickness. The chromatographic conditions were as follows: GC inlet temperature 250° C.; oven temperature program set 50° C. initially, to 130° C. at 35° C. per minute, and to 320° C. at 12° C. per minute and held for 6 minutes; column flow rate of 1.0 ml/min; a split flow rate of 1:75; injection volume of 1.0 micro liter; and mass spectra scan range 50-650 amu. The mass spectra were obtained from the TIC mode (total ion chromatogram) after GC separation.

$^1$H-NMR measurement (proton nuclear magnetic resonance) is from Avance 400 MHz spectrometer, unless specified otherwise, in solvent $CDCl_3$ and with TMS as internal standard.

The solid catalyst composition and polymers in the examples were measured according to the methods described herein. The following analytical methods are used to characterize the polymer.

Xylene soluble components (XS): 5.0 g of the polymer was added to 500 ml of xylenes (bp: 137~140° C.) and dissolved while maintaining the mixture at the boiling point over one hour. The mixture was cooled down to 5° C. within 20 minutes in an ice-water bath. Thereafter the ice-water bath was replaced with a 20° C. water bath and the mixture was equilibrated at 20° C. for 30 minutes. The soluble matters were separated from insoluble matters by filtration. The soluble components were dried with heating, and the polymer thus obtained was determined as xylene soluble components (wt %).

Melt Flow Rate: ASTM D-1238, determined at 230° C., under a load of 2.16 kg.

Molecular Weight (Mn and Mw): The weight average molecular weight (Mw), number average molecular weight (Mn), and molecular weight distribution (Mw/Mn) of polymers are obtained by gel permeation chromatography on Waters GPCV 2000 system using Polymer Labs Plgel 10 um MIXED-B LS 300×7.5 mm columns and 1,2,4-trichlorobenzene (TCB) as the mobile phase. The mobile phase is set at 1.0 ml/min, and temperature is set at 145° C. Polymer samples are heated at 15° C. for two hours. The injection volume is 299 microliters. External standard calibration of polystyrene narrow standards is used to calculate the molecular weight.

Magnesium ethoxide (98%), anhydrous tetrahydrofuran (THF, 99.9%), ethyl acetate (99.8%), anhydrous sodium sulfate (99.0%), anhydrous toluene (99.8%), $TiCl_4$ (99.9%), anhydrous n-heptane (99%), anhydrous pyridine (99.8%), 2,4-pentanediol (98.0%), benzoyl chloride (99%), phthaloyl chloride (90%), oxalyl chloride (98.0%), phenylglyoxylic acid (98.0%), diphenylphosphinic chloride (98.0%), 1,3-propanediol di-p-tosylate (98.0%), ethylene di(p-toluenesulfonate), 2-methyl-1-propanethiol (92.0%), 2,3-butanedithiol (99%), diisobutyl phthalate (99%), and triethylaluminum (93%) were all purchased from Sigma-Aldrich Co. of Milwaukee, Wis., USA.

Diisopropyldimethoxysilane (DIP-donor) was purchased from Gelest, Inc. of Morrisville, Pa., USA.

Unless otherwise indicated, all reactions were conducted under an inert atmosphere.

Example 1

Synthesis of
S,S-diisobutyl-1,2-benzenedicarbothioate

A 250 ml three-necked round bottom flask is charged with 100 ml anhydrous THF, 10.2 g (50 mmol) phthaloyl chloride and 10.5 g (117 mmol) 2-methyl-1-propanethiol. To this solution with stirring is added dropwise 30 ml THF solution of 9.5 g pyridine (120 mmol) over 20 minutes. After completion of the addition, the mixture is stirred at ambient temperature for 1 hour, and then heated refluxing for 4 hours. After the mixture is cooled to ambient temperature, the mixture is filtered and a clear solution is obtained. After the solvent and low boiling point impurity are removed at 100° C. under vacuum and the residue is cooled to ambient temperature, to the residue was added 30 ml ethyl acetate, and then added 20 ml saturated saline. The organic phase is separated and water phase extracted with 20 ml ethyl acetate twice. The combined organic phase was dried over anhydrous sodium sulfate. After removing the solvent, the crude product is heated and distilled with high vacuum and about 11.7 g of colorless viscous liquid is obtained. The name and structure of this compound is provided in Table 1.

$^1$H-NMR (CDCl$_3$/TMS) δ (ppm): 1.01-1.05 (d, 12H, CH$_3$), 1.90-1.97 (m, 2H, CH), 2.96-2.99 (d, 4H, —SCH$_2$—), 7.51-7.70 (m, 4H, ArH).

Example 2

Synthesis of benzenecarbothioic
acid-S,S'-2,3-butanediyl ester

Synthesis procedure is the same as described in Example 1, except that 6.0 g (50 mmol) of 2,3-butanedithiol and 16.1 g (115 mmol) benzoyl chloride are used to replace 2-methyl-1-propanethiol and phthaloyl chloride, respectively. After purification, 11.2 g of colorless viscous oil is obtained. The name and structure of this compound is provided in Table 1.

$^1$H-NMR (CDCl$_3$/TMS) δ (ppm): 1.49-1.54 (d, 6H, CH$_3$), 4.21-4.25 (m, 2H, —SCH—), 7.41-7.97 (m, 10H, ArH).

Example 3

Synthesis of 2,4-pentanediol diphenylglyoxylate (1) Preparation of phenylglyoxyloyl chloride A 250 ml two-necked round bottom flask is charged with 12.0 g (80 mmol) phenylglyoxylic acid and 41.0 g (320 mmol) oxalyl chloride. The mixture is heated and refluxed for 2 hours, and then stirred overnight at ambient temperature. After the excessive oxalyl chloride is removed out with distillation, the residue is cooled down and ready for the next step.

(2) Synthesis of 2,4-pentanediol diphenylglyoxylate

To the flask containing phenylglyoxyloyl chloride from step (1), is added 120 ml THF and 3.1 g 2,4-pentanediol (30 mmol). To this solution with stirring is added dropwise 30 ml THF solution of 12.0 g pyridine (150 mmol) over 30 minutes. After completion of the addition, the mixture is stirred at ambient temperature for 1 hour, and then heated refluxing for 4 hours. After the mixture is cooled to ambient temperature, the mixture is filtered and a clear solution obtained. The solution is washed with 20 ml saturated saline twice. The organic phase is separated and water phase extracted with 20 ml ethyl acetate twice. The combined organic phase was dried over anhydrous sodium sulfate. After removing the solvent and purification, 8.1 g of colorless viscous liquid is obtained. The target compound is determined by $^1$H-NMR and GC/MS. The name and structure of this compound is provided in Table 1.

$^1$H-NMR (CDCl$_3$/TMS) δ (ppm): 1.32-1.43 (d, 6H, CH$_3$), 1.77-2.35 (m, 2H, —CH$_2$—), 5.1.8-5.46 (m, 2H, —OCH—), 7.31-8.13 (m, 10H, ArH).

Example 4

Synthesis of 2,4-pentanediol benzoate
phenylgaloxylate (1) Preparation of 2,4-pentanediol monobenzoate A 250 ml three-necked round bottom flask is charged with 60 ml anhydrous THF, 21.0 g (200 mmol) 2,4-pentanediol and 3.6 g (45 mmol) pyridine. To this solution with stirring is added dropwise 30 ml THF solution of 5.6 g (40 mmol) benzoyl chloride over 30 minutes. After completion of the addition, the mixture is stirred at ambient temperature for 30 minute, and then heated refluxing for 3 hours and then stirred over night at ambient temperature. The mixture is filtered and a clear solution is obtained. After removing the solvent, the mixture is heated and distilled under vacuum to remove excessive 2,4-pentanediol. The crude 2,4-pentanediol monobenzoate can be used for next step.

(2) Synthesis of 2,4-pentanediol benzoate
phenylglyoxylate

To flask-I containing 2,4-pentanediol monobenzoate obtained from step (1), is added 100 ml anhydrous THF with stirring. To flask-II containing phenylglyoxyloyl chloride prepared from step 1 of example 3, is added 50 ml anhydrous THF with stirring. After dissolved, the mixture of flask-II is slowly transferred into flask-I. To the solution of flask-I with stirring, is added dropwise 30 ml THF solution of 6.0 g pyridine (75 mmol) over 20 minutes. After completion of the addition, the mixture is stirred at ambient temperature for 1 hour, and then heated refluxing for 2 hours. After the mixture is cooled to ambient temperature, the mixture is filtered and a clear solution is obtained. The solution is washed with 20 ml saturated saline twice and the organic phase is separated and water phase extracted with 20 ml ethyl acetate twice. The combined organic phase was dried over anhydrous sodium sulfate. After removing the solvent and purification, 7.6 g of colorless viscous liquid is obtained. The target compound is determined by $^1$H-NMR and GC/MS. The name and structure of this compound is provided in Table 1.

$^1$H-NMR (CDCl$_3$/TMS) δ (ppm): 1.31-1.42 (d, 6H, CH$_3$), 1.72-2.39 (m, 2H, —CH$_2$—), 5.20-5.40 (m, 2H, —OCH—), 7.41-8.19 (m, 10H, ArH).

Example 5

Synthesis of 2,4-pentanediol bis(diphenylphosphinate)

A 250 ml three-necked round bottom flask is charged with 10 ml anhydrous dichloromethane, 26.4 g (112 mmol) diphenylphosphinic chloride and 5.0 g (48 mmol) 2,4-pentanediol. The mixture is cooled down in ice bath and 30 ml THF solution of 9.5 g pyridine (120 mmol) is added dropwise over 30 minutes. The mixture is stirred in ice bath for 1 hour and at ambient temperature overnight, and then the mixture is filtered and a clear solution is obtained. After the solvent and low boiling point impurity are removed at 150° C. under vacuum and the residue is cooled to ambient temperature. To the residue was added 30 ml ethyl acetate, and then the solution is filtered. After removing the solvent and purification, 16.2 g of sticky compound is obtained. The name and structure of this compound is provided in Table 1.

$^1$H-NMR (CDCl$_3$/TMS) δ (ppm): 1.21-1.52 (d, 6H, CH$_3$), 1.75-2.45 (m, 2H, —CH$_2$—), 4.11-4.75 (m, 2H, —OCH—), 7.3-7.97 (m, 20H, ArH).

Example 6

Synthesis of 2,4-pentanediol benzoate diphenylphosphinate (1) 2,4-pentanediol monobenzoate is prepared by following step (1) of example 4.
(2) Synthesis of 2,4-pentanediol benzoate diphenylphosphinate To the flask of 2,4-pentanediol monobenzoate obtained from step (1) of example 4, is charged with 100 ml anhydrous dichloromethane and 3.6 g (45 mmol) pyridine. The mixture is cooled down in ice bath and, 9.5 g (40 mmol) diphenylphosphinic chloride in 30 ml dichloromethane solution is added dropwise over 30 minutes. After completion of the addition, the mixture is stirred in ice bath for 1 hour and at ambient temperature overnight, and then the mixture is filtered and a clear solution is obtained. After the solvent and low boiling point impurity are removed at 150° C. under vacuum and the residue is cooled to ambient temperature. To the residue was added 30 ml ethyl acetate, and then the solution is filtered. After removing the solvent and purification, 8.5 g of colorless sticky liquid is obtained. The name and structure of this compound is provided in Table 1.

$^1$H-NMR (CDCl$_3$/TMS) δ (ppm): 1.25-1.48 (d, 6H, CH$_3$), 1.73-2.39 (m, 2H, —CH$_2$—), 4.55-5.36 (m, 2H, —OCH—), 7.25-8.1 (m, 15H, ArH).

TABLE 1

| Examples | Name | Structure |
|---|---|---|
| Ex. 1 | S,S-diisobutyl-1,2-benzenedicarbothioate | |
| Ex. 2 | benzenecarbothioic acid-S,S'-2,3-butanediyl ester | |
| Ex. 3 | 2,4-pentanediol diphenylglyoxylate | |
| Ex. 4 | 2,4-pentanediol benzoate phenylglyoxylate | |

TABLE 1-continued

| Examples | Name | Structure |
|---|---|---|
| Ex. 5 | 2,4-pentanediol bis(diphenylphosphinate) | |
| Ex. 6 | 2,4-pentanediol benzoate diphenylphosphinate | |

The following examples demonstrate the application of selected non-phthalate compounds in the preparation of Ziegler-Natta catalysts for olefin polymerization.

Example 7

(A) Preparation of a Solid Catalyst Component

To a three-neck 250 ml flask equipped with a stirrer and thermometer, which is thoroughly purged with anhydrous nitrogen, 6.0 g of magnesium ethoxide and 80 ml of anhydrous toluene was introduced to form a suspension. 20 ml of TiCl4 was added through a stainless steel cannula. The temperature of the mixture was gradually raised to 80° C., and 2.35 g of S,S-diisobutyl-1,2-benzenedicarbothioate, obtained from Example 1, was then added. The temperature of the mixture was then increased to 110° C. and maintained for 2 hours with stirring. The hot mixture was transferred into a Schlenk type reactor equipped with a powered stirrer and a fritted filter disc, which is heated and maintained at the temperature 100° C. The resulting solid was filtered and washed twice with 60 ml of anhydrous toluene at 90° C., and then 80 ml of fresh anhydrous toluene and 20 ml TiCl4 was added to the filtered solid. Then the temperature of the mixture was heated to 110° C. and stirred for 2 hours. The residual solid was filtered and washed with anhydrous toluene three times at 90° C., and with anhydrous heptane twice at 90° C. and one time at ambient temperature. The final catalyst was collected and dried under vacuum to obtain a solid composition.

(B) Propylene Slurry Polymerization

Propylene was polymerized using a laboratory scale 2 liter stainless steel autoclave equipped with a stirrer and a jacket for heating and cooling, which was heated to a temperature above 100° C. and expelled all traces of moisture and air with a nitrogen purge. After allowing the reactor to cool to 50° C., under nitrogen, one liter of anhydrous heptane was introduced into the reactor, and then 2.5 mmol of triethyl aluminum and 0.2 mmol diisopropyldimethoxysilane (DIP-donor) were added, and then about 30.0 mg of the solid catalyst was obtained as disclosed above in the heptane suspension and was added successively into the autoclave. The temperature of the autoclave was kept at 50° C. and the pressure of autoclave was raised to 5.0 psig by introducing nitrogen. Hydrogen in a 150 ml vessel with a pressure of 8 psig was flushed into the reactor with propylene.

The reactor temperature was then raised to 70° C. and the total reactor pressure was raised to 90 psig by feeding propylene. The reaction was maintained for 1 hour under this condition with a continuous propylene feed to maintain a constant total pressure during the course of the polymerization. The system was then cooled to 50° C. and vented to reduce the pressure to 0 psig. The reactor was opened and 500 ml methanol was added to the reactor and the resulting mixture was stirred for 5 minutes and then filtered to obtain the polymer product. The obtained polymer was dried under vacuum at 80° C. for 6 hours. The polymer was weighed and tested with flow rate (MFR) and Xylene soluble (% XS). The results are listed in Table 2.

Example 8-12

The procedure of Example 7 was followed except that the synthesized compounds from Examples 2-6 are used instead of the compound S,S-diisobutyl-1,2-benzenedicarbothioate obtained from Example 1. The molar ratio between magnesium ethoxide and the synthesized compounds from Examples 2-6 is about 7, which is same as Example 7. The polymer was weighed and tested with flow rate (MFR) and Xylene soluble (% XS). The results are listed in Table 2.

Example 13

The procedure of Example 7 was followed except that the 1,3-propanediol di-p-tosylate is used instead of the compound S,S-diisobutyl-1,2-benzenedicarbothioate obtained from Example 1. The polymer was weighed and tested with flow rate (MFR) and Xylene soluble (% XS). The results are listed in Table 2.

Example 14

The procedure of Example 7 was followed except that ethylene di(p-toluenesulfonate) is used instead of the compound S,S-diisobutyl-1,2-benzenedicarbothioate obtained from Example 1. The polymer was weighed and tested with flow rate (MFR) and Xylene soluble (% XS). The results are listed in Table 2.

Comparative Example 5

The catalyst preparation and polymerization are the same as in Example 7 except that diisobutyl phthalate instead of the compound S,S-diisobutyl-1,2-benzenedicarbothioate obtained from Example 1. The molar ratio between magnesium ethoxide and diisobutyl phthalate about 7, which is same as Example 7. The polymer was weighed and tested with flow rate (MFR) and Xylene soluble (% XS). The results are listed in Table 2.

TABLE 2

| Examples | Internal donor | External donor | AC (gPP/gCat) | MFR (g/10 min) | XS (%) | Mw/Mn |
|---|---|---|---|---|---|---|
| Ex. 7 | S,S-diisobutyl-1,2-benzenedicarbothioate | DIP | 1897 | 4.4 | 2.7 | 5.0 |
| Ex. 8 | benzenecarbothioic acid-S,S'-2,3-butanediyl ester | DIP | 636 | 13.1 | 2.1 | 4.9 |
| Ex. 9 | 2,4-pentanediol diphenylglyoxylate | DIP | 2633 | 8.4 | 2.5 | 4.8 |
| Ex. 10 | 2,4-pentanediol benzoate phenylglyoxylate | DIP | 3125 | 7.6 | 2.6 | 4.9 |
| Ex. 11 | 2,4-pentanediol bis(diphenylphosphinate) | DIP | 1253 | 5.7 | 4.9 | 6.2 |
| Ex. 12 | 2,4-pentanediol benzoate diphenylphosphinate | DIP | 2333 | 5.4 | 2.7 | 5.3 |
| Ex. 13 | 1,3-propanediol di-p-tosylate | DIP | 737 | 11.6 | 2.7 | 7.3 |
| Ex. 14 | ethylene di(p-toluenesulfonate | DIP | 1234 | 7.1 | 2.3 | 6.3 |
| Comp. Ex. 1 | Diisobutyl phthalate | DIP | 3766 | 3.2 | 1.2 | 5.3 |

This invention provides a catalyst system which is capable of producing polypropylene with acceptable isotacticity and high MFR. As shown in Table 2, the propylene polymer produced using the catalyst components of the present invention exhibits an MFR value of greater than 4.0, or greater than 7.0, or greater than 10.0, or greater than 13.0 with acceptable isotacticity. On the other hand, the comparative example 1 with diisobutyl phthalate as internal donor produced propylene polymer with an MFR value of 3.2. As such, the present inventive catalyst system offers more flexibility to the applications regarding high melting flow ratio and wide molecular distribution range. It also provides a broader approach to produce phthalate-free polyolefins, thus eliminating the environmental issues and health concerns related to the phthalate-containing products.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings therein. Furthermore, no limitations are intended to the details of construction or design herein shown, other than as described in the claims below. It is therefore evident that the particular embodiments disclosed above may be altered or modified and all such variations are considered within the scope and sprit of the present invention. Whenever a numerical range with a lower limit and an upper limit is disclosed, and number falling within the range is specifically disclose. Moreover, the indefinite articles "a" or "an", as use in the claims, are defined herein to mean one or more than one of the element that it introduces.

What is claimed is:

1. A solid Ziegler-Natta type catalyst component for the polymerization or copolymerization of alpha olefins, comprising magnesium, titanium, halogen, and electron donors;

wherein the electron donors comprise at least one non-phthalate compound represented by the formula:

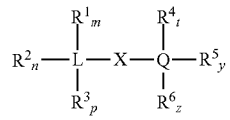

wherein $R^1$, $R^2$, $R^3$, $R^4$, $R^5$, and $R^6$ are independently selected from the groups consisting of aliphatic hydrocarbons, alicyclic hydrocarbons, aromatic hydrocarbons, and polycyclic hydrocarbons, wherein X is selected from the group consisting of aliphatic hydrocarbons, alicyclic hydrocarbons, and polycyclic hydrocarbons, wherein the subscripts m, n, p and t, y, z are independently selected from 0 to 3, and wherein Q is selected from the group consisting of carboxylic esters, alpha-keto esters, phosphonate esters, and sulfonate esters; and wherein L is selected from the groups consisting of:

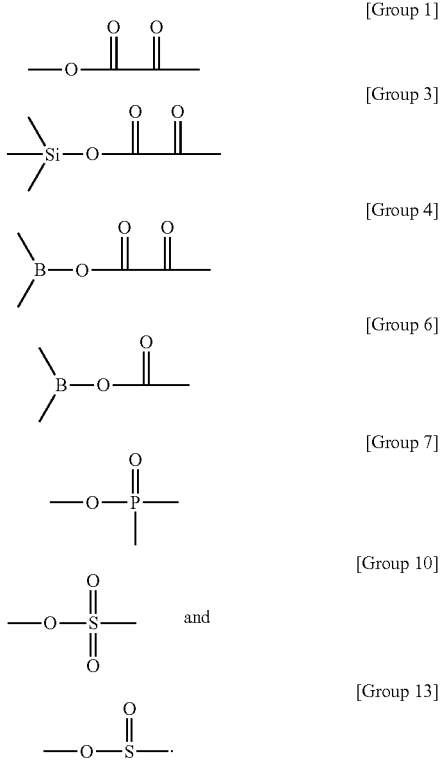

2. The solid catalyst component of claim 1, wherein Q is selected from the groups consisting of:

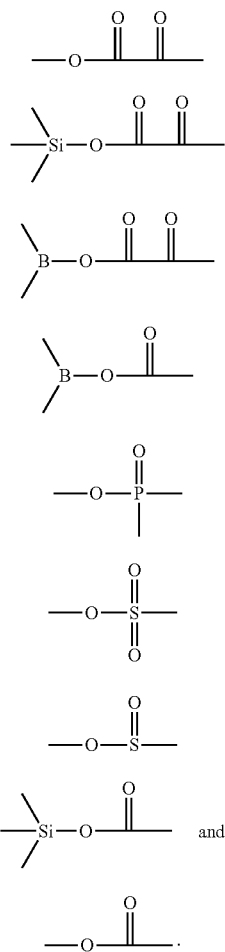

3. The solid catalyst component of claim 1, wherein the $R^1$, $R^2$, $R^3$, $R^4$, $R^5$ and $R^6$ groups may join to each other and/or to group X to form cycles.

4. The solid catalyst component of claim 1, wherein $R^1$, $R^2$ and $R^3$ may contain one or more heteroatoms selected from the group consisting of H, O, N, S, P, B, Si, and halogen atoms.

5. The solid catalyst component of claim 1, wherein $R^4$, $R^5$ and $R^6$ may contain one or more heteroatoms selected from the group consisting of H, O, N, S, P, B, Si, and halogen atoms.

6. The solid catalyst component of claim 1, wherein X may contain one or more heteroatoms selected from the group consisting of O, N, S, P, B, and halogen atoms.

7. The solid catalyst component of claim 4, wherein $R^1$, $R^2$ and $R^3$ is selected from the groups consisting of hydrogen, halogens, alkyls, substituted alkyls, cyclo-alkyls, aryls, arylalkyls, alkylaryls, alkenyls, cycloalkyls, and heterocycles.

8. The solid catalyst component of claim 5, wherein $R^4$, $R^5$ and $R^6$ is selected from the groups consisting of hydrogen, halogens, alkyls, substituted alkyls, cyclo-alkyls, aryls, arylalkyls, alkylaryls, alkenyls, cycloalkyls, and heterocycles.

9. The solid catalyst component of claim 1, wherein X is a C1-C20 hydrocarbon group.

10. The solid catalyst component of claim 1, wherein L and Q are identical.

11. A catalyst system for the polymerization or co-polymerization of alpha-olefins comprising:
(1) a solid catalyst component for the polymerization or co-polymerization of alpha-olefins comprising titanium, magnesium, halogen, and at least one non-phthalate compound represented by the formula:

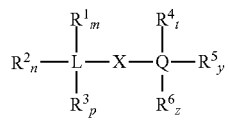

wherein $R^1$, $R^2$, $R^3$, $R^4$, $R^5$, and $R^6$ are independently selected from the groups consisting of aliphatic hydrocarbons, alicyclic hydrocarbons, aromatic hydrocarbons, and polycyclic hydrocarbons, wherein X is selected from the groups consisting of aliphatic hydrocarbons, alicyclic hydrocarbons, and polycyclic hydrocarbons, wherein the subscripts m, n, p and t, y, z are independently selected from 0 to 3, and wherein Q is selected from the group consisting of carboxylic esters, alpha-keto esters, phosphinate esters, and sulfonate esters; and wherein L is selected from the groups consisting of:

[Group 1]

[Group 3]

[Group 4]

[Group 6]

[Group 7]

[Group 10]

and

[Group 13]

(2) a co-catalyst component.

12. The catalyst system of claim 11, wherein the catalyst system further comprises one or more external electron donor components.

13. The catalyst system of claim 11, wherein Q is selected from the groups consisting of:

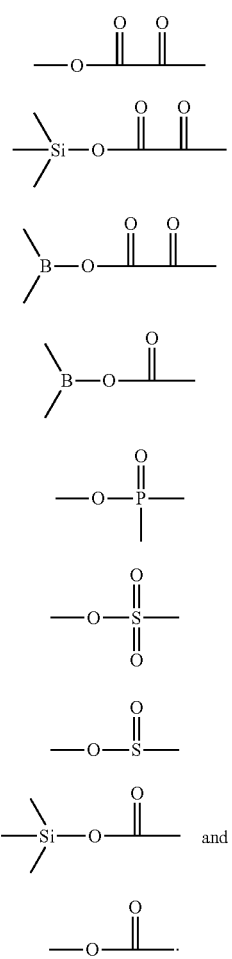

14. The catalyst system of claim 11, wherein the $R^1$, $R^2$, $R^3$, $R^4$, $R^5$ and $R^6$ groups may join to each other and/or to group X to form cycles.

15. The catalyst system of claim 11, wherein $R^1$, $R^2$ and $R^3$ may contain one or more heteroatoms selected from the group consisting of H, O, N, S, P, B, Si, and halogen atoms.

16. The catalyst system of claim 11, wherein $R^4$, $R^5$ and $R^6$ may contain one or more heteroatoms selected from the group consisting of H, O, N, S, P, B, Si, and halogen atoms.

17. The catalyst system of claim 11, wherein X may contain one or more heteroatoms selected from the group consisting of O, N, S, P, B, and halogen atoms.

18. The catalyst system of claim 15, wherein $R^1$, $R^2$ and $R^3$ is selected from the groups consisting of hydrogen, halogens, alkyls, substituted alkyls, cyclo-alkyls, aryls, arylalkyls, alkylaryls, alkenyls, cycloalkyls, and heterocycles.

19. The catalyst system of claim 16, wherein $R^4$, $R^5$ and $R^6$ is selected from the groups consisting of hydrogen, halogens, alkyls, substituted alkyls, cyclo-alkyls, aryls, arylalkyls, alkylaryls, alkenyls, cycloalkyls, and heterocycles.

20. The catalyst system of claim 11, wherein X is a C1-C20 hydrocarbon group.

21. The catalyst system of claim 11, wherein L and Q are identical.

22. A method for the polymerization or copolymerization of alpha-olefins, comprising:
   (1) providing a catalyst system for the polymerization or co-polymerization of alpha-olefins comprising a solid catalyst component comprising titanium, magnesium, halogen, and at least one non-phthalate compound represented by the formula:

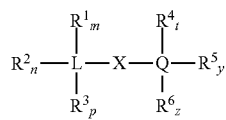

wherein $R^1$, $R^2$, $R^3$, $R^4$, $R^5$, and $R^6$ are independently selected from the groups consisting of aliphatic hydrocarbons, alicyclic hydrocarbons, aromatic hydrocarbons, and polycyclic hydrocarbons, wherein X is selected from the groups consisting of aliphatic hydrocarbons, alicyclic hydrocarbons, and polycyclic hydrocarbons, wherein the subscripts m, n, p and t, y, z are independently selected from 0 to 3, and wherein Q is selected from the group consisting of carboxylic esters, alpha-keto esters, phosphinate esters, and sulfonate esters; and wherein L is selected from the groups consisting of:

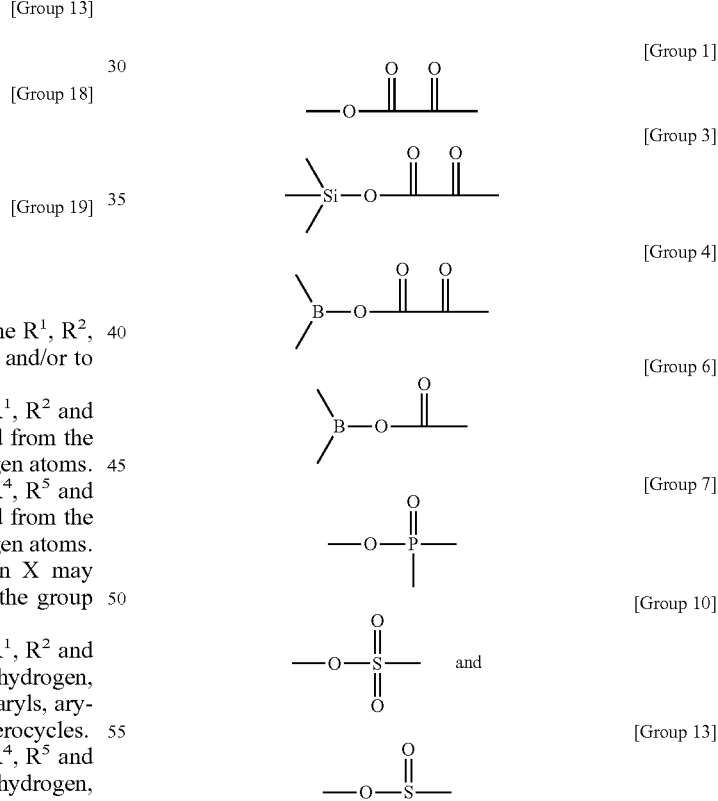

(2) polymerizing alpha-olefins in the presence of the catalyst system.

23. The method of claim 22, wherein the catalyst system further comprises one or more external electron donor components.

24. The method of claim 22, wherein Q is selected from the groups consisting of:

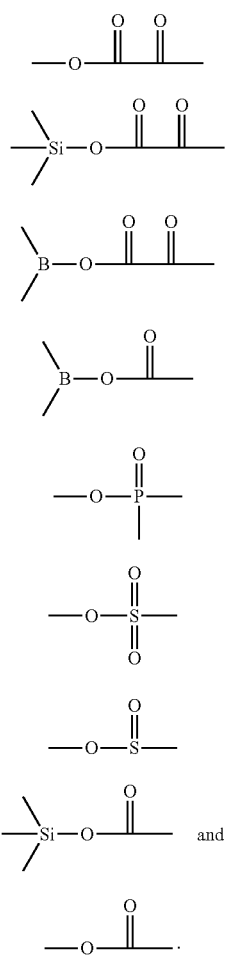

25. The method of claim 22, wherein the $R^1$, $R^2$, $R^3$, $R^4$, $R^5$ and $R^6$ groups may join to each other and/or to group X to form cycles.

26. The method of claim 22, wherein $R^1$, $R^2$ and $R^3$ may contain one or more heteroatoms selected from the group consisting of H, O, N, S, P, B, Si, and halogen atoms.

27. The method of claim 22, wherein $R^4$, $R^5$ and $R^6$ may contain one or more heteroatoms selected from the group consisting of H, O, N, S, P, B, Si, and halogen atoms.

28. The method of claim 22, wherein X may contain one or more heteroatoms selected from the group consisting of O, N, S, P, B, and halogen atoms.

29. The method of claim 26, wherein $R^1$, $R^2$ and $R^3$ is selected from the groups consisting of hydrogen, halogens, alkyls, substituted alkyls, cyclo-alkyls, aryls, arylalkyls, alkylaryls, alkenyls, cycloalkyls, and heterocycles.

30. The method of claim 27, wherein $R^4$, $R^5$ and $R^6$ is selected from the groups consisting of hydrogen, halogens, alkyls, substituted alkyls, cyclo-alkyls, aryls, arylalkyls, alkylaryls, alkenyls, cycloalkyls, and heterocycles.

31. The method of claim 22 wherein X is a C1-C20 hydrocarbon group.

32. The method of claim 22, wherein L and Q are identical.

33. The method of claim 1, wherein L contains at least two atoms selected from O, S, N, and P atoms.

34. The method of claim 1, wherein Q contains at least two atoms selected from O, S, N, and P atoms.

35. The catalyst system of claim 11, wherein L contains at least two atoms selected from O, S, N, and P atoms.

36. The catalyst system of claim 11, wherein Q contains at least two atoms selected from O, S, N, and P atoms.

37. The method of claim 22, wherein L contains at least two atoms selected from O, S, N, and P atoms.

38. The method of claim 22, wherein Q contains at least two atoms selected from O, S, N, and P atoms.

\* \* \* \* \*